US009070119B2

(12) United States Patent
Catipon, Jr. et al.

(10) Patent No.: US 9,070,119 B2
(45) Date of Patent: Jun. 30, 2015

(54) TIME TRACKING TECHNOLOGY

(75) Inventors: Jose B. Catipon, Jr., Quezon (PH); Eli June T. Infante, Manila (PH)

(73) Assignee: Accenture Global Services Limited, Dublin (IE)

( * ) Notice: Subject to any disclaimer, the term of this patent is extended or adjusted under 35 U.S.C. 154(b) by 627 days.

(21) Appl. No.: 13/191,516

(22) Filed: Jul. 27, 2011

(65) Prior Publication Data

US 2012/0065932 A1 Mar. 15, 2012

(30) Foreign Application Priority Data

Jul. 29, 2010 (PH) ............................ 1-2010-000229

(51) Int. Cl.
*G04F 1/00* (2006.01)
*G06Q 10/10* (2012.01)

(52) U.S. Cl.
CPC .................................... *G06Q 10/109* (2013.01)

(58) Field of Classification Search
CPC .................................................... G06F 11/3423
USPC .......................................................... 702/178
See application file for complete search history.

(56) References Cited

U.S. PATENT DOCUMENTS

| | | | | | |
|---|---|---|---|---|---|
| 5,696,702 | A | * | 12/1997 | Skinner et al. | 702/186 |
| 5,991,742 | A | * | 11/1999 | Tran | 705/32 |
| 2003/0204367 | A1 | * | 10/2003 | Hartigan et al. | 702/178 |
| 2003/0225989 | A1 | * | 12/2003 | Licalsi | 711/167 |
| 2004/0249601 | A1 | * | 12/2004 | Circenis | 702/178 |
| 2005/0010461 | A1 | * | 1/2005 | Manos | 705/8 |
| 2006/0004540 | A1 | * | 1/2006 | Hamilton et al. | 702/176 |

OTHER PUBLICATIONS

Corresponding Australian application No. 2011205029, Office Action dated Oct. 11, 2012, 3 pages.

* cited by examiner

*Primary Examiner* — Janet Suglo
*Assistant Examiner* — Stephanie Bloss
(74) *Attorney, Agent, or Firm* — Fish & Richardson P.C.

(57) ABSTRACT

Time tracking technology, in which a time tracking tool tracks time spent in completing one or more tasks. The time tracking tool may perform operations related to tracking time based on activity of a computer operating the time tracking tool relative to status of the time tracking tool. In addition, the time tracking tool may track a continuous time an issue has been in need of resolution, track a working time that indicates an amount of time spent working on resolving the issue, and provide alerts based on application of one or more alert trigger rules to the tracked continuous time and the tracked working time. Further, the time tracking tool may provide reports that include category and sub-category information for tracked timing data.

13 Claims, 19 Drawing Sheets

1500

1510 1520 1530 1540

| | Issue | Continuous Time | Working Time | Users |
|---|---|---|---|---|
| 1550 | Issue 1 | 48 Hours | 2 Hours | User 1 |
| 1552 | Issue 2 | 4 Hours | 2 Hours | User 1 |
| 1554 | Issue 3 | 30 Minutes | 30 Minutes | User 2 |
| 1556 | Issue 4 | 12 Hours | 24 Hours | User 1 – 8 Hours<br>User 2 – 8 Hours<br>User 3 – 8 Hours |
| 1558 | Issue 5 | 7 Days | 6 Hours | User 4 – 4 Hours<br>User 5 – 2 Hours |
| 1560 | Issue 6 | 48 Hours | 0 Minutes | User 5 |

DISTRIBUTION OF INCIDENTS ACCORDING TO CATEGORY

| Function | PROACTIVE | | PREVENTIVE | | OUTAGE | | TOTAL |
|---|---|---|---|---|---|---|---|
| | Team | Escalated | Team | Escalated | Team | Escalated | |
| Function 1 | 270 | 2 | 675 | 1 | 6 | 4 | 958 |
| Function 2 | 256 | 1 | 360 | 0 | 5 | 1 | 623 |
| Function 3 | 361 | 11 | 20 | 0 | 1 | 0 | 393 |
| Function 4 | 220 | 6 | 68 | 2 | 2 | 0 | 298 |
| Function 5 | 250 | 17 | 29 | 1 | 1 | 0 | 298 |
| Function 6 | 106 | 0 | 178 | 2 | 2 | 0 | 288 |
| Function 7 | 110 | 0 | 8 | 1 | 3 | 0 | 122 |
| Function 8 | 23 | 0 | 41 | 0 | 22 | 0 | 86 |
| Function 9 | 51 | 1 | 13 | 0 | 1 | 0 | 66 |
| Function A | 14 | 0 | 6 | 0 | 8 | 2 | 30 |
| Function B | 12 | 0 | 9 | 0 | 2 | 0 | 23 |
| Function C | 4 | 0 | 16 | 0 | 1 | 1 | 22 |
| Function D | 21 | 0 | 1 | 0 | 0 | 0 | 22 |
| Function E | 16 | 0 | 4 | 1 | 0 | 0 | 21 |
| Function F | 7 | 4 | 6 | 0 | 0 | 0 | 17 |
| Function G | 12 | 0 | 0 | 0 | 0 | 0 | 12 |
| Function H | 0 | 0 | 0 | 0 | 1 | 1 | 2 |
| Function I | 0 | 0 | 1 | 0 | 0 | 0 | 1 |
| **TOTAL** | 1733 | 42 | 1435 | 8 | 55 | 9 | 3282 |
| **PERCENT** | 52.8 | 1.28 | 43.72 | 0.24 | 1.68 | 0.27 | 100.00 |

1800

TOTAL TIME UTILIZATION ACCORDING TO CATEGORY

| Function | Proactive | Preventive | Outage | Adhoc | Routine | Monitoring | TOTAL |
|---|---|---|---|---|---|---|---|
| Function 1 | 8349 | 1749 | 27 | 396 | 182 | 50718 | 61424 |
| Function 2 | 3166 | 10558 | 522 | 3049 | 7157 | 26472 | 50927 |
| Function 3 | 12021 | 770 | 26 | 2935 | 264 | 19205 | 35224 |
| Function 4 | 7690 | 1242 | 692 | 5517 | 1170 | 4566 | 21179 |
| Function 5 | 1575 | 1390 | 317 | 4544 | 496 | 11196 | 19521 |
| Function 6 | 686 | 229 | 76 | 55 | 67 | 14632 | 15750 |
| Function 7 | 839 | 277 | 485 | 517 | 0 | 13140 | 15261 |
| Function 8 | 317 | 1370 | 621 | 2655 | 63 | 6148 | 11177 |
| Function 9 | 1227 | 491 | 231 | 434 | 57 | 7188 | 9630 |
| Function A | 333 | 454 | 637 | 2431 | 1173 | 4138 | 9169 |
| Function B | 1734 | 3802 | 993 | 697 | 0 | 1005 | 8233 |
| Function C | 1295 | 593 | 490 | 208 | 0 | 3040 | 5631 |
| Function D | 473 | 0 | 0 | 110 | 217 | 3871 | 4672 |
| Function E | 490 | 128 | 0 | 347 | 0 | 433 | 1399 |
| Function F | 0 | 0 | 0 | 30 | 0 | 928 | 958 |
| Function G | 0 | 42 | 0 | 0 | 18 | 776 | 837 |
| Function H | 534 | 150 | 0 | 0 | 0 | 103 | 788 |
| Function I | 141 | 17 | 0 | 0 | 0 | 281 | 440 |
| Function J | 0 | 0 | 49 | 269 | 0 | 0 | 319 |
| **TOTAL** | 40873 | 23262 | 5166 | 24198 | 10854 | 165140 | 272539 |
| **PERCENT** | 15.0 | 8.54 | 1.9 | 8.88 | 3.99 | 61.69 | 100.00 |

TIME TRACKING TECHNOLOGY

CROSS REFERENCE TO RELATED APPLICATIONS

The present application claims the benefit of Philippines Patent Application No. 1-2010-000229, filed on Jul. 29, 2010, which is incorporated herein by reference in its entirety for all purposes.

FIELD

The present disclosure generally relates to time tracking technology.

BACKGROUND

An electronic timer may enable a user to track an amount of time the user spends on a particular task. The user may start and stop the electronic timer to control when time is being tracked in relation to the particular task. The tracked time may be stored and used to provide a report of the tracked time.

SUMMARY

In one aspect, a computer-implemented method is described for performing an operation related to a time tracking tool based on activity of a computer relative to status of the time tracking tool. The method includes monitoring status of a time tracking tool configured to track time spent in completing one or more tasks and monitoring activity of a computer associated with the time tracking tool relative to the status of the time tracking tool. The method also includes evaluating the activity of the computer relative to the status of the time tracking tool with respect to one or more rules and determining whether the activity of the computer relative to the status of the time tracking tool warrants performance of an operation related to the time tracking tool based on the evaluation. The method further includes, in response to a determination that the activity of the computer relative to the status of the time tracking tool warrants performance of an operation related to the time tracking tool, performing an operation related to the time tracking tool based on the activity of the computer relative to the status of the time tracking tool.

Implementations may include one or more of the following features. For example, the method may include, in response to a determination that the activity of the computer relative to the status of the time tracking tool does not warrant performance of an operation related to the time tracking tool, continuing to monitor activity of the computer associated with the time tracking tool relative to the status of the time tracking tool. The method also may include monitoring whether or not a timer included in the time tracking tool has been tracking time, tracking an amount of time the computer has been idle while the timer included in the time tracking tool has been tracking time, and comparing the tracked amount of time the computer has been idle while the timer included in the time tracking tool has been tracking time to a threshold amount of time. The method further may include determining whether the threshold amount of time has been exceeded by the tracked amount of time based on the comparison and performing an operation related to stopping the timer in response to a determination that the threshold amount of time has been exceeded by the tracked amount of time.

In addition, the method may include, in response to a determination that the threshold amount of time has not been exceeded, continuing to track an amount of time the computer has been idle while the timer included in the time tracking tool has been tracking time. The method may include automatically, without user input, stopping the timer from tracking time and providing output that indicates that the timer was automatically stopped due to the amount of time the computer has been idle while the timer has been tracking time.

Further, the method may include automatically, without user input, providing an interface that includes an alert indicating that the computer has been idle for a relatively long period of time while the timer has been tracking time and that includes at least one control that enables a user to stop the timer. The method also may include providing an interface that identifies one or more inactive time periods during which the computer was idle while the timer was tracking time and that includes at least one control that enables a user to remove the one or more inactive time periods from time tracked by the timer.

In some examples, the method may include monitoring whether or not any timer included in the time tracking tool has been tracking time, tracking an amount of time the computer has been active while no timer included in the time tracking tool has been tracking time, and comparing the tracked amount of time the computer has been active while no timer included in the time tracking tool has been tracking time. In these examples, the method may include determining whether the threshold amount of time has been exceeded by the tracked amount of time based on the comparison and performing an operation related to starting a timer in the time tracking tool in response to a determination that the threshold amount of time has been exceeded by the tracked amount of time.

In some implementations, the method may include, in response to a determination that the threshold amount of time has not been exceeded, continuing to track an amount of time the computer has been active while no timer included in the time tracking tool has been tracking time. The method also may include automatically, without user input, starting the timer to track time and providing output that indicates that the timer was automatically started due to the amount of time the computer has been active while no timer included in the time tracking tool has been tracking time.

In addition, the method may include automatically, without user input, providing an interface that includes an alert indicating that the computer has been active for a relatively long period of time while no timer included in the time tracking tool has been tracking time and that includes at least one control that enables a user to start the timer. The method also may include providing an interface that identifies one or more active time periods during which the computer was active while no timer included in the time tracking tool was tracking time and that includes at least one control that enables a user to add the one or more active time periods to time tracked by the timer.

In another aspect, a computer-implemented method is described for providing reporting using stored time tracking data. The method includes tracking a continuous time an issue has been in need of resolution, tracking a working time that indicates an amount of time spent working on resolving the issue, and comparing the tracked continuous time and the tracked working time to one or more alert trigger rules. The method also includes determining whether an alert is needed based on the comparison and providing an alert based on the one or more alert trigger rules in response to a determination that an alert is needed.

Implementations may include one or more of the following features. For example, the method may include providing reporting based on the tracked continuous time and the tracked working time. The method also may include comparing the tracked continuous time to a threshold amount of time and determining whether the comparison of the tracked continuous time to the threshold amount of time reveals that the tracked continuous time exceeds the threshold amount of time. The method further may include, in response to a determination that the tracked continuous time exceeds the threshold amount of time, providing an interface that includes an alert indicating that the tracked continuous time exceeds the threshold amount of time, an identification of the issue, an indication of the tracked continuous time, and at least one control that enables a user to facilitate handling of the issue based on the alert.

In some examples, the method may include comparing the tracked working time to a threshold amount of time and determining whether the comparison of the tracked working time to the threshold amount of time reveals that the tracked working time exceeds the threshold amount of time. In these examples, the method may include, in response to a determination that the tracked working time exceeds the threshold amount of time, providing an interface that includes an alert indicating that the tracked working time exceeds the threshold amount of time, an identification of the issue, an indication of the tracked working time, and at least one control that enables a user to facilitate handling of the issue based on the alert.

In some implementations, the method may include computing a percentage of the tracked working time relative to the tracked continuous time, comparing the computed percentage to a threshold percentage, and determining whether the comparison of the computed percentage to the threshold percentage reveals that the computed percentage is below the threshold percentage. In these implementations, the method may include, in response to a determination that the computed percentage is below the threshold percentage, providing an interface that includes an alert indicating that the tracked working time is low relative to the tracked continuous time, an identification of the issue, an indication of the tracked working time, an indication of the tracked continuous time and at least one control that enables a user to facilitate handling of the issue based on the alert.

In yet another aspect, a computer-implemented method is described for providing reporting using stored time tracking data. The method includes initiating tracking of time for an issue being handled by one or more users of a company and determining a category for timing data tracked by one or more users of the company in handling the issue. The method also includes determining one or more sub-categories for the timing data tracked by one or more users of the company in handling the issue and storing, in electronic storage, data describing the category and the one or more sub-categories in association with the timing data tracked by one or more users of the company in handling the issue. The method further includes providing a report that includes category and sub-category information for tracked timing data using the category and the one or more sub-categories stored in association with timing data tracked by one or more users of the company in handling the issue.

Implementations may include one or more of the following features. For example, the method may include determining a category corresponding to each time entry tracked by each of multiple different, users handling the issue. The determined category for a first time entry tracked by a first user may be different than the determined category for a second time entry tracked by a second user. In this example, the method may include determining multiple sub-categories corresponding to each time entry tracked by each of the multiple different, users handling the issue. The multiple sub-categories for the first time entry tracked by the first user may be different than the multiple sub-categories for the second time entry tracked by the second user. In addition, the method may include providing a report that identifies timing data broken down into multiple, different categories and broken down into multiple, different sub-categories for each of the multiple, different categories.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIGS. 15, 17, and 18 illustrate example reports.

Like reference numbers represent corresponding parts throughout.

DETAILED DESCRIPTION

Techniques are described for a time tracking tool that allows information technology (IT) professionals to easily log all of their activities amidst busy day-to-day pressures of work and with a relatively low amount of time. Use of the time tracking tool by members of an IT group may enable comprehensive and accurate Operational Metrics Reporting both for its individual and overall group accomplishments.

Figure 1:
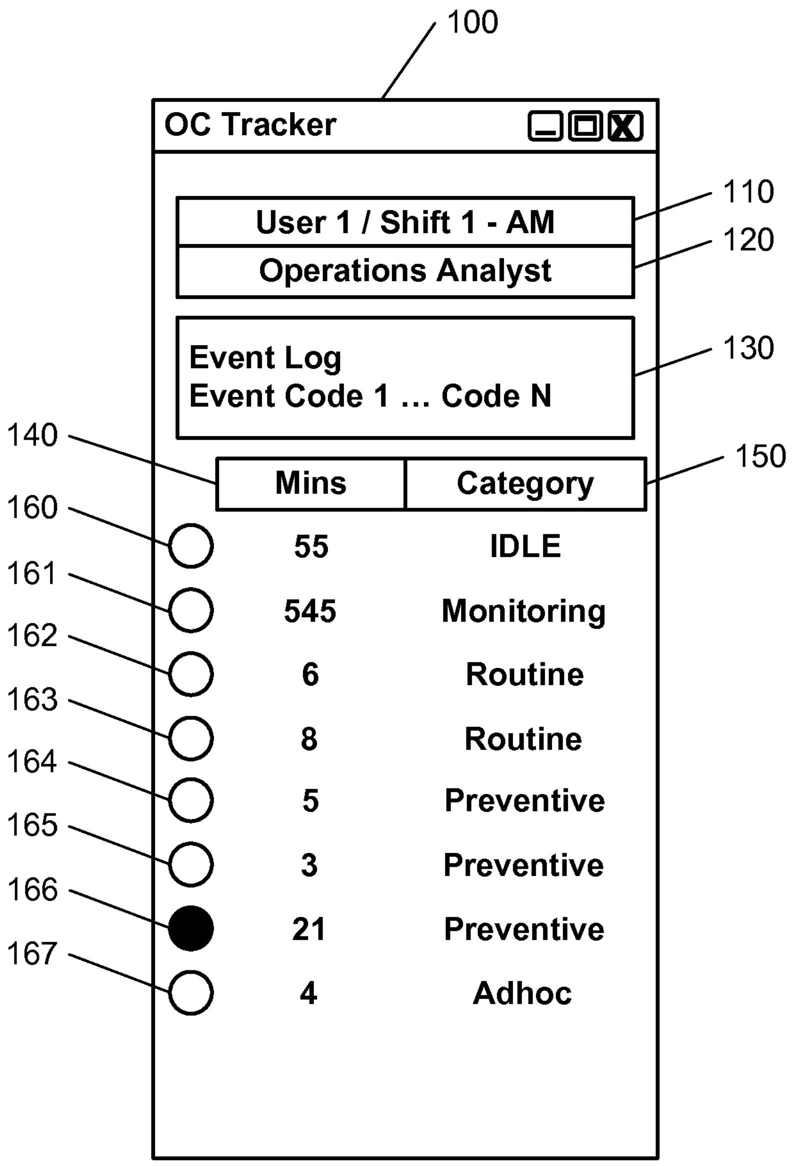
FIGS. 1-3, 8, 10, 11, and 14 illustrate examples of time tracker tool interfaces.

FIG. 1 illustrates an example of a time tracker tool interface 100. The time tracker tool enables a user to track time spent in completing tasks the user performs. The time tracker tool may include multiple timers to track multiple, different types of tasks and allows the user to assign a category and/or description to particular timers to log the type of task being performed during the time period tracked by the corresponding timer. The time tracker tool enables easy toggling between tasks and provides logging and reporting capabilities associated with tracked time.

In some implementations, the time tracker tool is a light, small, and compact application that remains always on top of a user's computer screen, but also may be hidden. The time tracker tool may be a terminate stay resident application that may be easily accessed using a mouse-over command.

The time tracker tool interface 100 includes a user identification field 110 and a title identification field 120. The user identification field 110 displays identifying information for the user (e.g., User 1) whose time is currently being tracked using the time tracker tool interface 100 and/or identifying information of the current shift (e.g., Shift 1—AM) being tracked using the time tracker tool interface 100. The title identification field 120 displays a title (e.g., Operations Analyst) of the user whose time is currently being tracked using the time tracker tool interface 100.

The time tracker tool interface 100 also includes an event log area 130. The event log area 130 displays events logged by the time tracking tool. The event log area 130 may display an event code for each of the events logged by the time tracking tool. The event codes may be descriptive of the type of events that have been logged by the time tracking tool, such as "server is down," "application is down," "network is down," etc.

The time tracker tool interface 100 further includes a time column 140 and a category column 150. The time column 140 displays an amount of time that has been tracked by timers displayed in the time tracker tool interface 100. The amount of time may be displayed in any unit of time, such as hours, minutes, and/or seconds. The category column 150 displays a category associated with timers displayed in the time tracker tool interface 100. The category may be selected from a predefined list of categories that are descriptive of tasks performed by the user whose time is currently being tracked using the time tracker tool interface 100. For instance, the category column 150 may display a monitoring category when a timer is being used to track time spent completing a monitoring task, may display a routine category when a timer is being used to track time spent completing a routine task, may display a preventive category when a timer is being used to track time spent completing a preventive task, and may display a proactive category when a timer is being used to track time spent completing a proactive task. The category column 150 also may display an idle category when a timer is being used to track idle time when user input is not being provided to a computer on which the time tracker tool interface 100 is being displayed (e.g., when there are no keyboard or mouse movements). Other types of categories may be tracked in the category column 150.

In some implementations, time tracker tool interface 100 includes a third column where the description of each task is at least partially shown. In these implementations, the third column displays data that enables user to immediately identify the task he would like to move to without having to click each task and reading description through the area 130. When the time tracker tool interface 100 displays partial description information in the third column, the time tracker tool interface 100 may display full description information for a task when a user provides input interacting with the partial description information for the task (e.g., display full description information in a popup interface when the user hovers over or clicks on the partial description information for the task shown in the third column).

In addition, the time tracker tool interface 100 includes timers 160, 161, 162, 163, 164, 165, 166, and 167. As shown, each of the timers 160, 161, 162, 163, 164, 165, 166, and 167 has a corresponding amount of time tracked by the timer displayed in the time column 140 and a category associated with the timer displayed in the category column 150. The timer 166 has a filled timer indicator to indicate that the timer 166 is currently the active timer that is tracking time. The timers 160, 161, 162, 163, 164, 165, and 167 have unfilled timer indicators to indicate that the timers 160, 161, 162, 163, 164, 165, and 167 are currently inactive timers that are not tracking time. A user may easily toggle between timing different tasks by changing which of the timers 160, 161, 162, 163, 164, 165, 166, and 167 is active. The user may change one of the inactive timers to active by using a mouse to click or double-click on the timer indicator for the inactive timer the user wants to make active.

In some examples, the time tracker tool uses a centralized database (DB) to store time tracking information, instead of a local personal computer DB. The centralized DB allows the time tracking tool to be deployed in a corporate environment and capture time tracking data from a large number of employees. All types of time tracking data (e.g., user identification, user group identification, task identification, amount of time, category, etc.) may be captured to enable consolidated reporting for a large number of employees. For instance, when the time tracker tool uses a centralized structured query language (SQL) DB and a robust DB design, the time tracker tool may allow for a wide range of reporting possibilities, including time utilization, incident frequency, incident time pattern, total incident, client-specific reporting, etc. The time tracker tool may determine and report time utilization per function and per category of task. In addition, the time tracker tool may track subcategories, which allow for even more reporting possibilities. The time tracker tool may export time tracking data from the DB and transcribe it into time and expense reports.

In some implementations, the time tracker tool allows for timed-alerting, enabling operators to escalate individual tasks according to escalation time (e.g., fifteen minutes, thirty minutes, forty-five minutes, sixty minutes, etc.). The timed-alerting enables monitoring of time critical tasks with alarms being provided to users (or supervisors) at particular times within a task. The alarms may enable users (or supervisors) to escalate tasks to meet client deadlines and/or adjusts efforts to meet client budgets. Escalation of tasks may include contracting a task currently being handled by an internal IT employee to an external IT service providing company.

Further, the time tracker tool may have turn-over status reporting capability, which allows the next shift to continue working on the same issue as a prior shift. With turn-over status, the time spent on a task may be turned-over to another user such that the time spent on a particular task may be continuously tracked over work completed by two users working different shifts. This enables the second user to understand how much time has been spent on the task by the prior shift and adjust efforts to meet client deadlines and budgets. In addition, turn-over status ensures that a second user on a later shift is assigned to continue working on a task that needs additional work prior a first user returning to work on his or her next shift. For example, the time tracker tool may be connected to an electronic mail (or other messaging) application and a first employee ending a shift may assign an unresolved task to a second employee beginning a shift for completion or continued work. In this example, the time tracker tool controls the electronic mail (or other messaging) application to send an electronic mail (or other electronic) message to the second employee to indicate that the task has been turned over to the second employee. The electronic mail (or other electronic) message may include additional details (e.g., comments from the first employee) related to the task to assist the second employee in seamlessly continuing work on the task.

In some implementations, the time tracker tool indicates different statuses for a task other than merely open and closed. In these implementations, the status for a task may additionally include escalated, turned-over, and pending. A task may have a status of escalated when the task is escalated outside of the organization to a third party for handling. A task may have a status of turned-over when the task is turned-over from a first user that is ending a shift to a second user that is beginning or continuing on the next shift. A task may have a status of pending when the task is not deemed to be critical and other tasks may be completed prior to completing the pending task. The range of statuses for a task may provide additional reporting and tracking capabilities that allow for more effective and efficient handling of tasks.

In addition, the time tracker tool may include security features. The time tracker tool may leverage operating system user authentication and limit write access to DB administrators. Also, the time tracker tool may have a daily backup policy (e.g., Native DB Backup). The time tracker tool may be active-directory authenticated, allowing for a more secured and accurate task reporting, and also may track login identifiers to limit a particular user to tracking time using only one timer at a time. The security features may assist in ensuring that the time tracked with the time tracker tool is authentic and accurate.

In some examples, the time tracker tool may include data integrity features. In these examples, an operating system user may be automatically logged in as the user of the time tracker tool. In addition, start time and end time may be logged and an active or running time field may be tracked. The time tracker tool further may implement separate editable time duration for Outages and ensure latest-version control.

In some implementations, the time tracker tool has a reference field for an external ticketing system. In these implementations, the time tracker tool allows for an integrated approach in issue logging and resolution. For instance, the time tracker tool may send a reference identifier to the external ticketing system and retrieve, from the external ticketing system, more details related to a timer. The time tracker tool may have a ticketing field that allows a user to pull in information from the external ticketing system.

Figure 2:
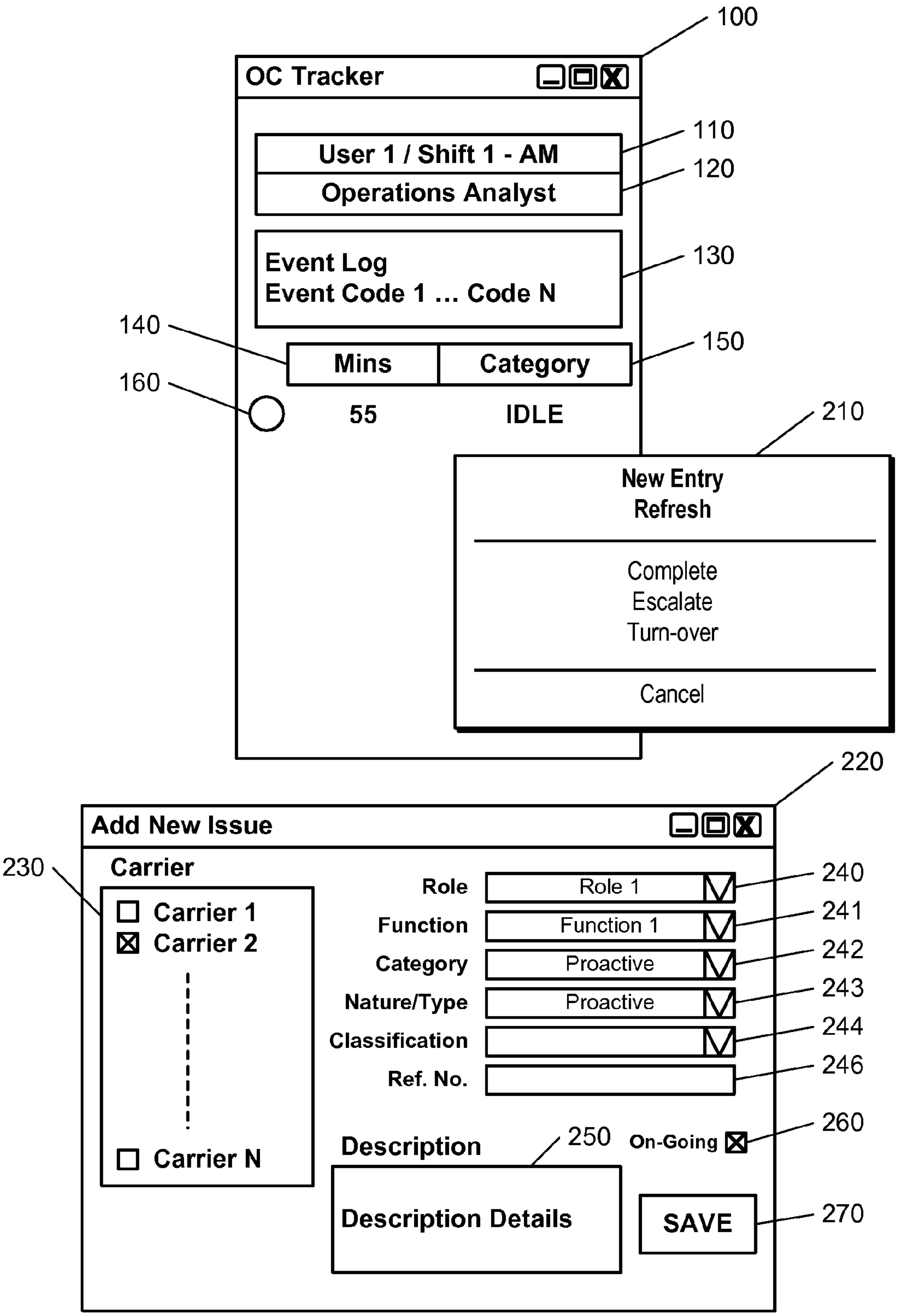

FIG. 2 illustrates an example of adding a new entry in the time tracker tool interface 100. As shown, the time tracker tool may receive user input of a mouse right click at the timer area of the time tracker tool interface 100 and, in response to the user input, display a menu list 210. The menu list 210 includes two active options (New Entry and Refresh) and four inactive options (Complete, Escalate, Turn-over, and Cancel). The inactive options are inactive in this example because they relate to operations performed on a previously-added timer and the user has not selected a timer. For instance, the Turn-over option is the capability to pass on the task to another resource in the next shift. The active options include adding a new entry and refreshing the timer list.

When the time tracker tool receives input selecting the New Entry option, the time tracker tool displays an Add New Issue interface area 220. The Add New Issue interface area 220 includes a carrier entry area 230 that enables a user to select the carrier to which the new entry pertains. In this example, the tasks being tracked by the time tracking tool relate to tasks appropriate for carriers and, as such, the entry area 230 lists the carriers being serviced. In other examples where different types of tasks are being tracked, the entry area 230 may list other types of clients or companies.

The Add New Issue interface area 220 also includes a role entry control 240, a function entry control 241, a category entry control 242, a nature/type entry control 243, a classification entry control 244, and a reference number entry control 246. The role entry control 240 enables a user to select the role associated with the task being tracked. The role may identify the primary job role of the resource. The function entry control 241 enables a user to select the function associated with the task being tracked. Each role may have different functions associated with it (e.g., Role=Data Center Services; Function=Systems Management or Storage Management) and the function entry control 241 may be used to specify which function is being performed. The category entry control 242 enables a user to select the category associated with the task being tracked. The nature/type entry control 243 enables a user to select the nature/type or sub-categorization associated with the task being tracked. For instance, the nature/type or sub-categorization may include OS-Administration, Patch Management, Problem Resolution, etc. The classification entry control 244 enables a user to select the classification associated with the task being tracked. The reference number entry control 246 enables a user to enter the reference number (e.g., a reference number of an external ticketing system) associated with the task being tracked. As shown in FIG. 2, Function 1 has been selected and the Proactive category has been selected. No data has been entered for the classification and the reference number because Proactive tasks may not include a classification or a reference number, as the classification and the reference number may be appropriate for Outage situations or when a user is handling a requested (rather than a Proactive) task.

The Add New Issue interface area 220 further includes a description entry control 250, an on-going entry control 260, and a save input button 270. The description entry control 250 enables a user to enter a text description of the task being tracked, the on-going entry control 260 enables a user to provide input indicating whether or not the task is on-going, and the save input button 270 enables a user to save the data inputted to the Add New Issue interface area 220.

Figure 3:
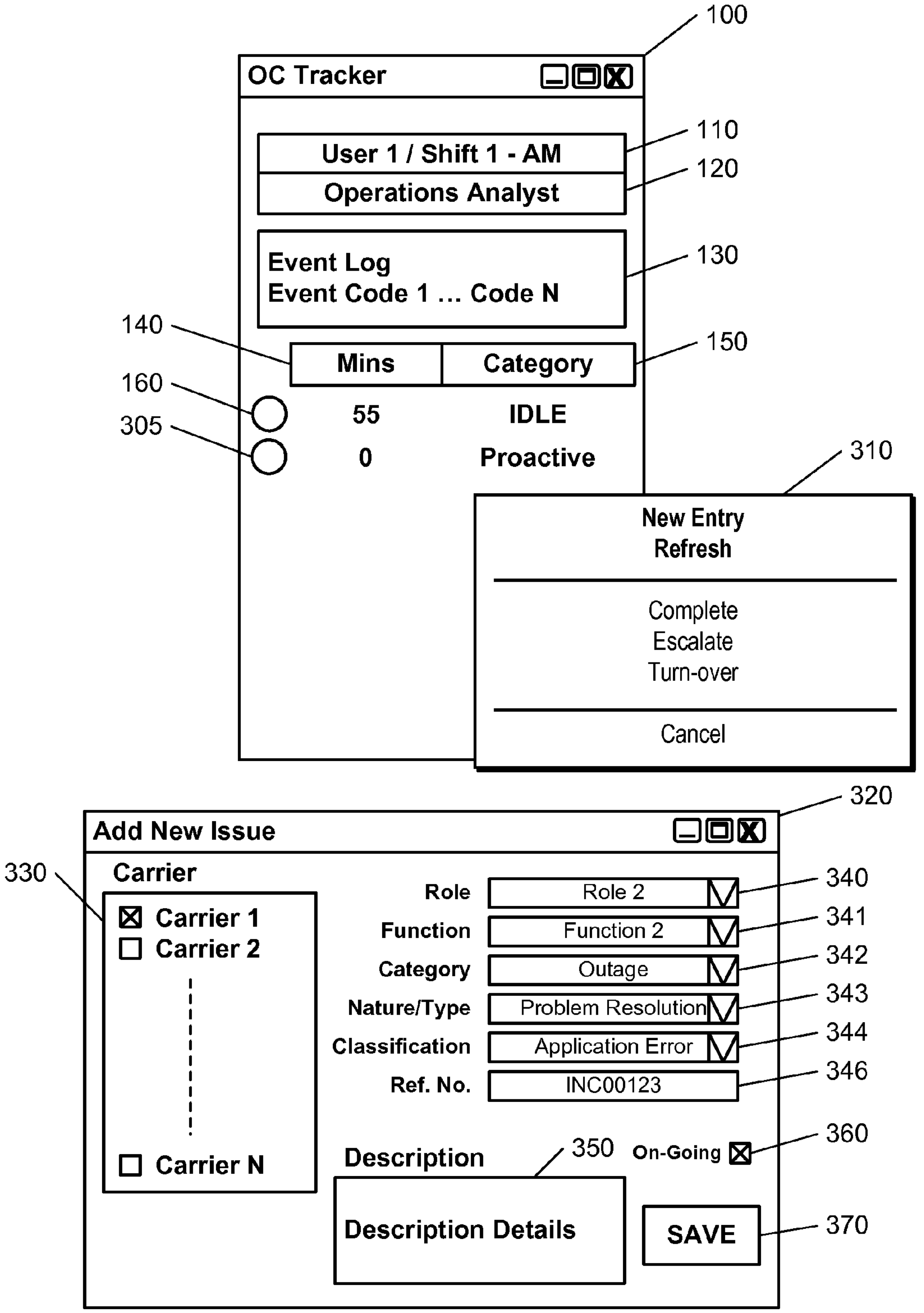

FIG. 3 illustrates another example of adding a new entry in the time tracker tool interface 100. As shown in FIG. 3, a new timer 305 has been added to the timer display area of the time tracker tool interface 100 based on the input received in the example shown in FIG. 2. In addition, the time tracker tool displays a menu list 310 in response to user input of a mouse right click at the timer area of the time tracker tool interface 100. The menu list 310 may be similar to the menu list 210 described above with respect to FIG. 2.

When the time tracker tool receives input selecting the New Entry option in the menu list 310, the time tracker tool displays an Add New Issue interface area 320. The Add New Issue interface area 320 includes a carrier entry area 330, a role entry control 340, a function entry control 341, a category entry control 342, a nature/type entry control 343, a classification entry control 344, a reference number entry control 346, a description entry control 350, an on-going entry control 360, and a save input button 370. The role entry control 340, the function entry control 341, the category entry control 342, the nature/type entry control 343, the classification entry control 344, the reference number entry control 346, the description entry control 350, the on-going entry control 360, and the save input button 370 may be similar to the carrier entry area 230, the role entry control 240, the function entry control 241, the category entry control 242, the nature/type entry control 243, the classification entry control 244, the reference number entry control 246, the description entry control 250, the on-going entry control 260, and the save input button 270, respectively.

As shown in FIG. 3, Function 2 has been selected and the Outage category has been selected. Because the Outage category was selected, the classification of Application Error has been selected to identify the cause of the outage and a reference number has been entered to identify the reference number of the outage in an external ticketing system.

Figure 4:
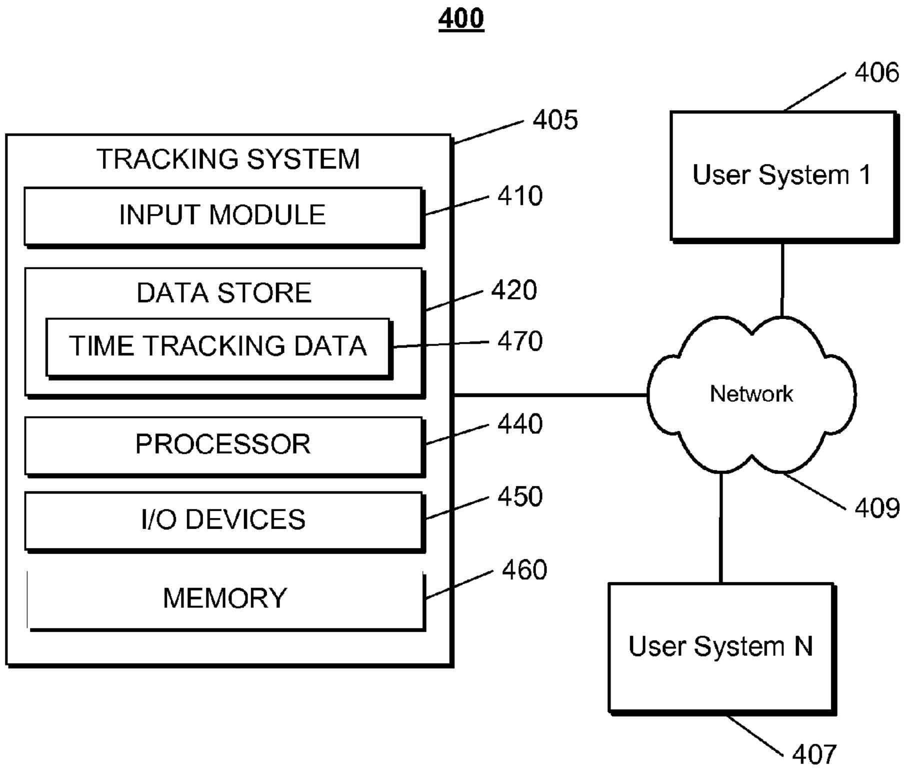
FIGS. 4 and 19 are block diagrams illustrating example systems.

FIG. 4 illustrates a system 400 which includes a tracking system 405 connected to multiple user systems 406 and 407 over a network 409. The tracking system 405 includes an input module 410, a data store 420, a processor 440, one or more I/O (Input/Output) devices 450, and memory 460. The tracking system 405 may communicate with multiple user systems 406 and 407 to enable the tracking system 405 to track time entered by multiple users located at different locations. The network 409 may be an IP (Internet Protocol) based network, using, for example, technologies such as UMTS (Universal Mobile Telecommunications System), CDMA (Code Division Multiple Access), GPRS (General Packet Radio Service), or EVDO (Evolution Data Optimized). Each of the user systems 406 and 407 may be a handheld PC (personal computer), wireless handheld device, laptop, smart phone, desktop computer, or other device.

The input module 410 may be used to input any type of information related to performing time tracking functionality. The input module 410 may input time tracking and reporting configuration data, may input tracked timing data, and/or may input reporting requests. For example, configuration data, tracked timing data, and/or reporting requests may be received from one or more of the user systems 406 and 407.

In some implementations, data from the input module 410 is stored in the data store 420. The data store 420 may be, for example, a relational database that logically organizes data into a series of database tables. The data included in the data store 420 may be, for example, data resulting from tasks timed by multiple, different users. Each database table arranges data in a series of columns (where each column represents an attribute of the data stored in the database) and rows (where each row represents attribute values). The data store 420 may be, for example, an object-oriented database that logically or physically organizes data into a series of objects. Each object may be associated with a series of attribute values. The data store 420 also may be a type of database management system that is not necessarily a relational or object-oriented database. For example, a series of XML (Extensible Mark-up Language) files or documents may be used, where each XML file or document includes attributes and attribute values. Data included in the data store 420 may be identified by a unique identifier such that data related to a particular task may be retrieved from the data store 420.

The data store 420 may include time tracking data 470 for multiple, different users (e.g., multiple, different employees of an IT group). The time tracking data 470 may store data, for each user, that reflects tasks tracked by the user. For instance, the time tracking data 470 may include timer data tracked by time tracking tools operating on the user systems 406 and 407. The time tracking data 470 may include any of the task description data (e.g., category, sub-category, user identifier, etc.) described throughout this disclosure.

The processor 440 may be a processor suitable for the execution of a computer program such as a general or special purpose microprocessor, and any one or more processors of any kind of digital computer. In some implementations, the tracking system 405 includes more than one processor 440. The processor 440 may receive instructions and data from memory 460. Memory 460 may store instructions and data corresponding to any or all of the components of the tracking system 405. Memory 460 may include read-only memory, random-access memory, or both.

The I/O devices 450 are configured to provide input to and output from the tracking system 405. For example, the I/O devices 450 may include a mouse, a keyboard, a stylus, or any other device that allows the input of data into the tracking system 405 or otherwise communicate with the tracking system 405. The I/O devices 450 may also include a display, a printer, or any other device that accepts data from the tracking system 405 and outputs the accepted data to a user of the tracking system 405. The network 409 may be one or more public or private, wired or wireless networks, such as the Internet.

Figure 5:
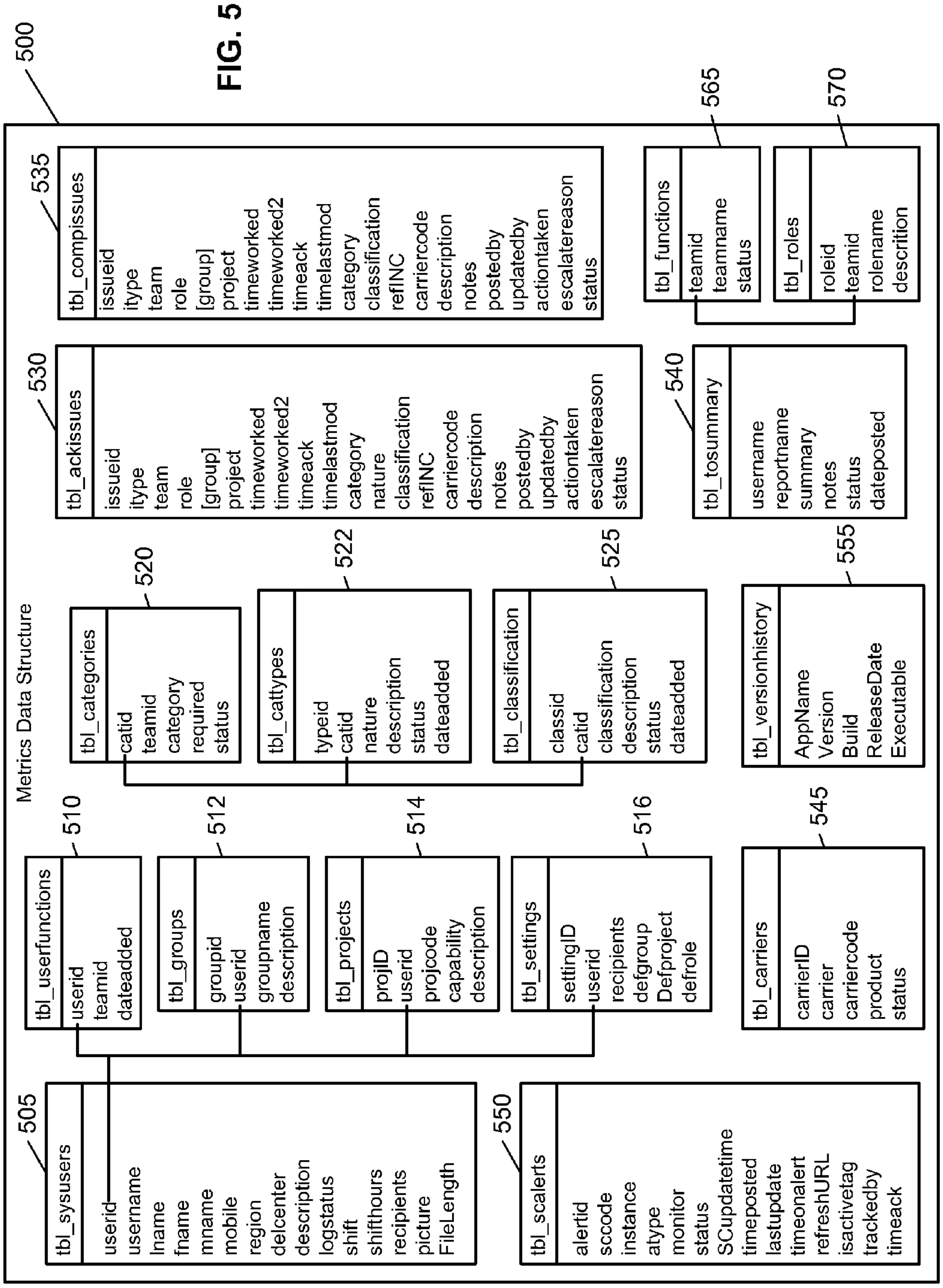
FIG. 5 is a diagram of an example data structure.

FIG. 5 illustrates an example data structure 500 for the tracking system 400. The data structure 500 may be used to organize the time tracking data 470 stored in the data store 420. The data structure 500 shows example database tables that store time tracking data and relationships among the database tables. As shown, the data structure 500 includes a system users table 505, a user functions table 510, a groups table 512, a projects table 514, a settings table 516, a categories table 520, a category types table 522, a classification table 525, an ackissues table 530, a compissues table 535, a summary table 540, a carriers table 545, an alerts table 550, a version history table 555, a functions table 565, and a roles table 570. The tables 505, 510, 512, 514, 516, 520, 522, 525, 530, 535, 540, 545, 550, 555, 565, and 570 store data related to tracking tasks and issues handled by a group of users. The data stored in the data structure 500 may be queried to generate reports descriptive of the tracked data.

Figure 6:
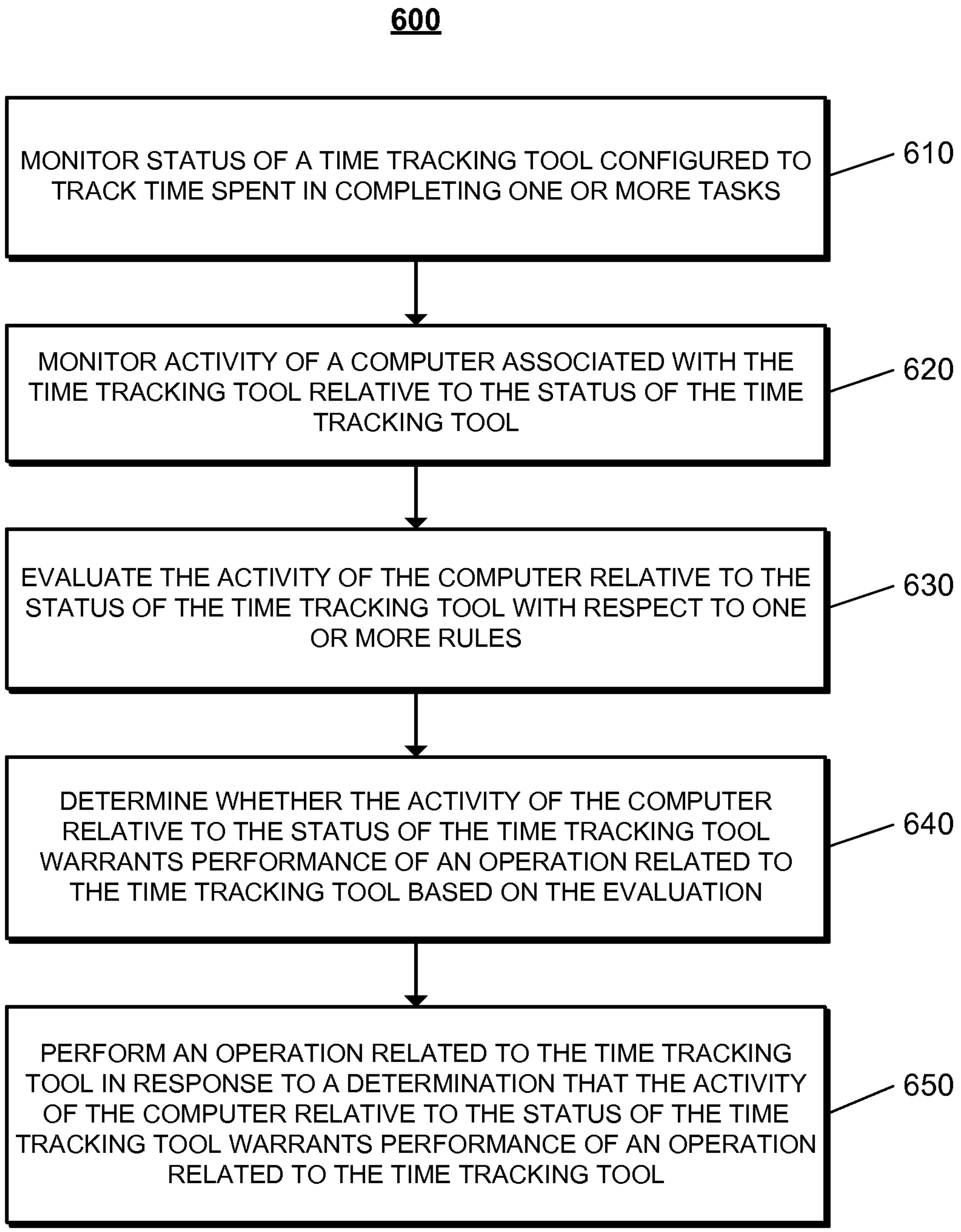
FIGS. 6, 7, 9, 12, and 16 are flowcharts of example processes.

FIG. 6 illustrates a process 600 for performing an operation related to a time tracking tool based on activity of a computer relative to status of the time tracking tool. The operations of the process 600 are described generally as being performed by the system 400. The operations of the process 600 may be performed by one of the components of the system 400 (e.g., the tracking system 405, the user system 406, or the user system 407) or may be performed by a combination of the components of the system 400. In some implementations, operations of the process 600 may be performed by one or more processors included in one or more electronic devices.

The system 400 monitors status of a time tracking tool configured to track time spent in completing one or more tasks (610). For example, the system 400 may monitor whether the time tracking tool is tracking time using a timer or not tracking time. In this example, the system 400 may determine whether any of the timers included in the time tracking tool is tracking time. In response to a determination that none of the timers included in the time tracking tool is tracking time, the system 400 determines that the time tracking tool is not tracking time and stores, in electronic storage, status data indicating the status of the time tracking tool as not tracking time. In response to a determination that a timer included in the time tracking tool is tracking time, the system 400 identifies the timer that is tracking time and stores, in electronic storage, status data indicating the status of the time tracking tool as tracking time in association with data identifying the timer that is active.

The system 400 may periodically determine the status of the time tracking tool, continuously determine the status of the time tracking tool, or determine the status of the time tracking tool in response to events (e.g., user input) that result in a change to the time tracking tool. The system 400 may store, in electronic storage, time tracking tool status data that indicates a status of the time tracking tool (e.g., tracking time or not tracking time) and a time period corresponding to the status. The time tracking tool status data may be a table that includes a status column to identify a status of the tool, a time period column that identifies the time period corresponding to the status, and a timer column that identifies the timer tracking time when the time tracking tool is determined to be tracking time.

The system 400 monitors activity of a computer associated with the time tracking tool relative to the status of the time tracking tool (620). For example, the system 400 may monitor whether the computer operating the time tracking tool is receiving user input, running an application, or performing another action that suggests the computer is actively being used by a user. In this example, the system 400 may monitor keyboard input and/or mouse movements to determine whether or not the computer is being actively used. When the system 400 determines that the computer is being actively used (e.g., keyboard and/or mouse input is being received), the system 400 determines that the computer is in an active state. When the system 400 determines that the computer is not being actively used (e.g., no keyboard and/or mouse input is being received), the system 400 determines that the computer is in an idle state.

The system 400 may periodically determine the activity of the computer or continuously determine the activity of the computer. The system 400 may store, in electronic storage, computer activity data that indicates a state of the computer (e.g., active or idle) and a time period corresponding to the state. The computer activity data may be a table that includes a state column to identify an activity state of the computer and a time period column that identifies the time period corresponding to the state. The computer activity data may be stored in association with the time tracking tool status data to represent the activity of the computer relative to the status of the time tracking tool.

The system 400 evaluates the activity of the computer relative to the status of the time tracking tool with respect to one or more rules (630). For instance, the system 400 may compare the state of the computer (e.g., active or idle) and the status of the time tracking tool (e.g., tracking time or not tracking time) for an overlapping time period to a set of one or more rules. The one or more rules may specify that certain actions are to occur based on particular patterns of computer activity as compared to the status of the time tracking tool. For example, the system 400 may determine that the time tracking tool is properly being controlled to track time when the state of the computer is active and the time tracking tool is tracking time or when the state of the computer is idle and the time tracking tool is not tracking time. The system 400 also may determine that the time tracking tool is not properly being controlled to track time when the state of the computer is active and the time tracking tool is not tracking time or when the state of the computer is idle and the time tracking tool is tracking time.

The one or more rules also may define more detailed patterns of computer activity as compared to the status of the time tracking tool. For instance, the one or more rules may define thresholds related to the activity of the computer relative to the status of the time tracking tool. The system 400 may determine that the time tracking tool is not properly being controlled to track time when the computer activity does not match the status of the time tracking tool for at least a threshold period of time. In this regard, the system 400 may ignore relatively short periods in which the computer activity does not match the status of the time tracking tool. More sophisticated patterns of the activity of the computer relative to the status of the time tracking tool may be tracked and evaluated over time.

The system 400 determines whether the activity of the computer relative to the status of the time tracking tool warrants performance of an operation related to the time tracking tool based on the evaluation (640). For example, the system 400 determines whether criteria specified by the one or more rules warrants performance of an operation related to the time tracking tool. In this example, the one or more rules may specify that performance of an operation is warranted when the monitored computer activity does not match the monitored status of the time tracking tool at a particular point in time and that performance of an operation is not warranted when the monitored computer activity matches the monitored status of the time tracking tool at a particular point in time. In this regard, when the system 400 determines that the computer is idle while the time tracking tool is tracking time or when the system 400 determines that the computer is active while the time tracking tool is not tracking time, the system 400 determines that performance of an operation is warranted. When the system 400 determines that the computer is idle while the time tracking tool is not tracking time or when the system 400 determines that the computer is active while the time tracking tool is tracking time, the system 400 determines that performance of an operation is not warranted and continues to monitor computer activity relative to time tracking tool status without performing an operation. The one or more rules may specify that performance of an operation is warranted as soon as the system 400 detects a mismatch between the monitored computer activity and the monitored status of the time tracking tool.

In some examples, the one or more rules may specify that performance of an operation is warranted after the system 400 detects a mismatch between the monitored computer activity and the monitored status of the time tracking tool for at least a threshold period of time. In these examples, the system 400 may measure a length of time that the monitored computer activity does not match the monitored status of the time tracking tool and compare the measured length of time to a threshold amount of time (e.g., fifteen minutes). When the system 400 determines, based on the comparison, that the monitored computer activity has not matched the monitored status of the time tracking tool for the threshold amount of time (or longer), the system 400 determines that performance of an operation is warranted. When the system 400 determines, based on the comparison, that the monitored computer activity has not matched the monitored status of the time tracking tool for less than the threshold amount of time, the system 400 determines that performance of an operation is not warranted and continues to monitor the length of time that the monitored computer activity does not match the monitored status of the time tracking tool to determine whether it reaches the threshold amount.

The system 400 performs an operation related to the time tracking tool in response to a determination that the activity of the computer relative to the status of the time tracking tool warrants performance of an operation related to the time tracking tool (650). For instance, the system 400 may provide an alert to a user of the time tracking tool, automatically control operation of the time tracking tool (e.g., automatically start or stop a timer), or record the issue for later reporting or handling. The system 400 may perform any of the operations related to the time tracking tool described throughout this disclosure. In response to a determination that the activity of the computer relative to the status of the time tracking tool does not warrant performance of an operation related to the time tracking tool, the system 400 continues to monitor computer activity relative to time tracking tool status without performing an operation.

Figure 7:
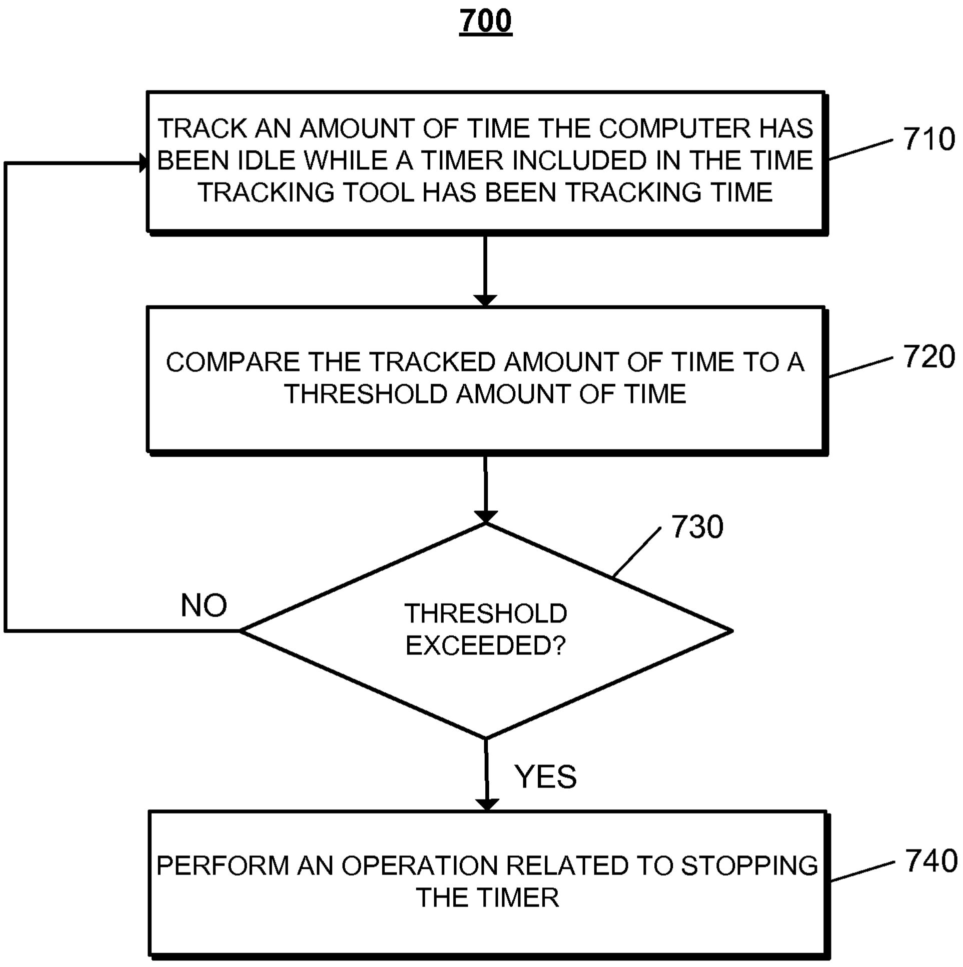

FIG. 7 illustrates a process 700 for performing an operation related to stopping a timer based on idle time of a computer. The operations of the process 700 are described generally as being performed by the system 400. The operations of the process 700 may be performed by one of the components of the system 400 (e.g., the tracking system 405, the user system 406, or the user system 407) or may be performed by a combination of the components of the system 400. In some implementations, operations of the process 700 may be performed by one or more processors included in one or more electronic devices.

The system 400 tracks an amount of time the computer has been idle while a timer included in the time tracking tool has been tracking time (710). For instance, the system 400 detects that the computer operating the time tracking tool is in an idle state (e.g., is not receiving user input through a keyboard, mouse, etc.) while a timer is tracking time and measures the length of time the computer remains in the idle state while the timer is tracking time. The system 400 may reset the tracked amount of time when the computer becomes active or the timer is stopped. The system 400 may only monitor activity of the computer when a timer in the time tracking tool is tracking time.

The system 400 compares the tracked amount of time to a threshold amount of time (720). For instance, the system 400 may access a threshold value from electronic storage and compare the threshold value to the tracked or measured amount of time the computer has been in the idle state while the timer is tracking time.

The system 400 determines whether the threshold amount of time has been exceeded based on the comparison (730). For example, the system 400 determines whether the comparison reveals that the computer has been in the idle state while the timer is tracking time for more or less than the threshold amount of time. In response to a determination that the threshold amount of time has not been exceeded, the system 400 continues to track an amount of time the computer has been idle while the timer included in the time tracking tool has been tracking time.

In response to a determination that the threshold amount of time has been exceeded, the system 400 performs an operation related to stopping the timer in response to a determination that the threshold amount of time has been exceeded (740). For instance, the system 400 may provide an alert to a user of the time tracking tool to stop the timer, automatically stop the timer, or record the period of inactivity (e.g., idle time) during operation of the timer for later reporting or handling. In implementations in which the system 400 automatically stops the timer, the system 400 may automatically stop the timer at the point in which the threshold is determined to have been exceeded. The system 400 also may automatically adjust the timer to remove the time tracked while the computer was idle during the threshold amount of time such that the timer is effectively stopped at the point where the computer became idle.

Figure 8:
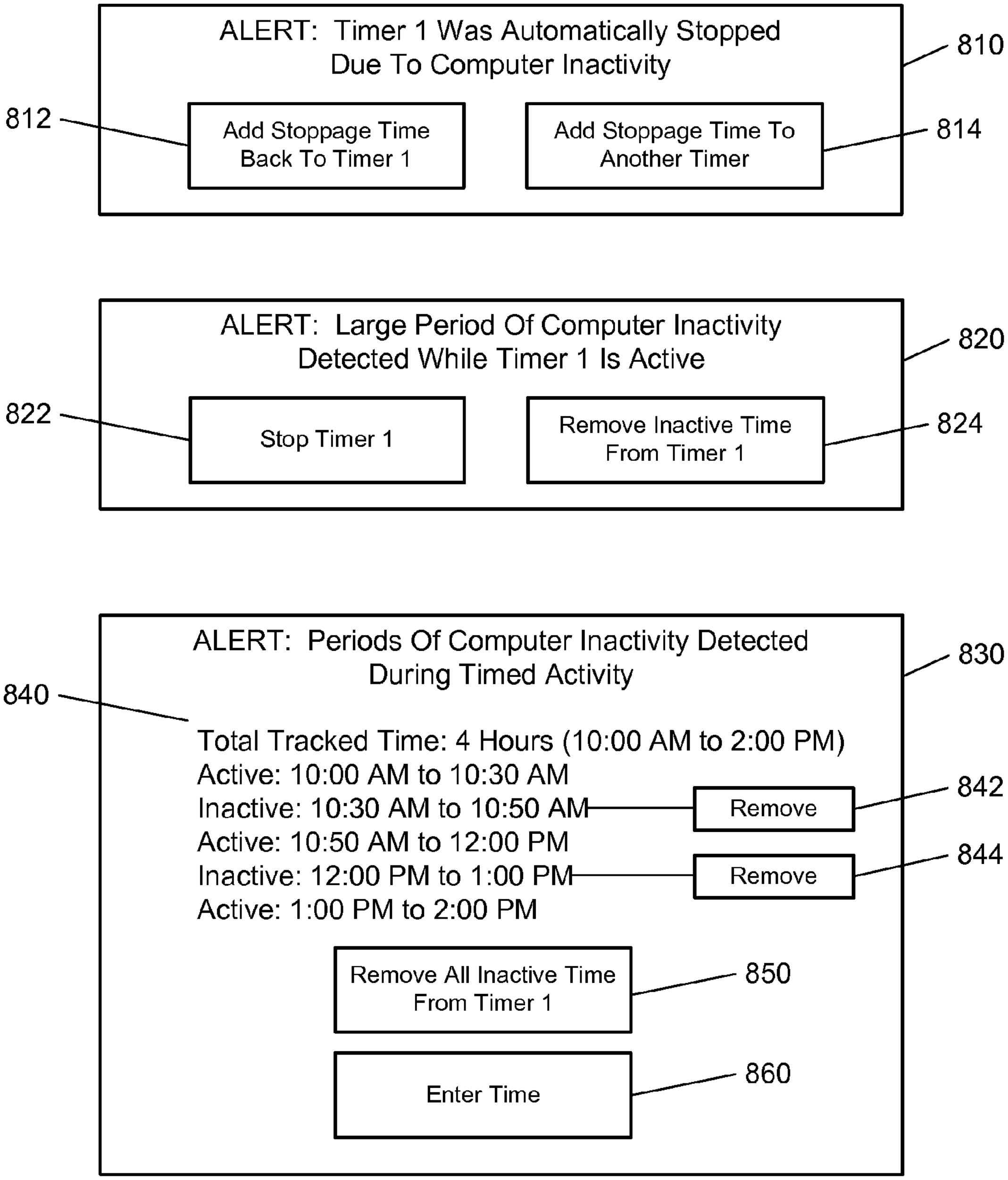

FIG. 8 illustrates example user interfaces that may be displayed in performing an operation related to stopping a timer. The interface 810 may be displayed to a user when the system 400 automatically stops a timer in response to a determination that a threshold amount of time has been exceeded by a tracked amount of time the computer has been idle while the timer has been tracking time. The interface 810 includes an alert to indicate that the system 400 automatically stopped the timer due to inactivity of the computer while the timer was tracking time.

The interface 810 also includes interface controls 812 and 814 that enable a user to add the time during which the timer was automatically stopped to a timer. For instance, when the system 400 automatically stops the timer, the system 400 also may begin tracking an amount of time during which the timer was automatically stopped (e.g., stoppage time). By tracking the stoppage time, the system 400 allows a user to easily account for the stoppage time when the user was actually working on a task during the automatic stoppage of the timer. This may occur when the user continues to work on the timed task without using the computer (e.g., talks to a colleague, etc.) or works on another task without using the computer.

The interface control 812 allows a user to add the tracked stoppage time back to the timer that was automatically stopped. When the user was working on the timed task during the computer inactivity, the interface control 812 may allow the user to easily cause the timer to reflect the appropriate amount of time the user was working on the task as if the automatic stoppage had not occurred.

The interface control 814 allows a user to add the tracked stoppage time to another timer other than the timer that was automatically stopped. When the user was working on another task during the computer inactivity (e.g., was called away to assist a colleague on another matter), the interface control 814 may allow the user to easily add the automatic stoppage time to another timer to track time spent working on the other task. For example, the automatic stoppage time may be added to an existing timer in the time tracking tool or may be added to a new timer created for the other task. In this example, the interface control 814 may cause display of another interface that allows the user to select an existing timer or a new timer as the destination for the automatic stoppage time. The timer that was automatically stopped remains at the time of the automatic stoppage, as it reflects the time the user spent working on the corresponding task.

The interface 820 may be displayed to a user to alert the user that the time tracking tool may not be properly tracking time. The interface 820 includes an alert to indicate that the system 400 has detected a relatively long period of computer inactivity while a timer has been tracking time. The interface 820 may be displayed as a pop-up message on the computer operating the time tracking tool. The interface 820 also may be part of an electronic message (e.g., electronic mail message, instant message, text message, etc.) sent to the user logged into the time tracking tool. When the interface 820 is part of an electronic message, the user may receive the alert provided by the interface 820 using a remote device and control the timer from the remote device. This may be helpful when the user inadvertently leaves a timer running when the user leaves the office.

The interface 820 also includes interface controls 822 and 824 that enable a user to control the active timer. The interface control 822 allows a user to stop the active timer at the current time. The interface control 824 allows a user to stop the active timer and remove the tracked period of inactive computer time from the timer. When a user inadvertently leaves a timer running when the user leaves the office, the interface control 824 may allow the user to easily adjust the active timer to reflect the accurate amount of time the user spent working on the task.

The interface 830 may be displayed to a user when the user is entering time tracked by a timer and the system 400 determines that periods of inactivity exist during the tracked time. The interface 830 includes an alert to indicate that the system 400 detected periods of computer inactivity during the time tracked by the timer.

The interface 830 also provides a detailed report 840 of the computer activity during the period of time tracked by the timer and enables the user to remove periods of computer inactivity. The detailed report 840 shows that the total tracked time as four hours and identifies three periods during the total tracked time where the computer was actively being used and two periods during the total tracked time where the computer was idle.

The interface 830 further includes interface controls 842, 844, and 850 that enable a user to remove periods during the total tracked time where the computer was idle. Removing the inactive time periods upon time entry essentially acts as a retroactive stopping of the timer during the periods of idle computer time.

The interface control 842 enables the user to remove the first period of idle computer time and the interface control 844 enables the user to remove the second period of idle computer time. The interface control 850 enables the user to easily remove all of the periods of idle computer time (e.g., the first and second periods of idle computer time) without having to individually remove each period of idle computer time. In the example shown in FIG. 8, the user may use the interface control 850 to remove all of the periods of idle computer time when the user took a coffee break between 10:30 AM and 10:50 AM and a lunch break between 12:00 PM and 1:00 PM, but forgot to stop the timer during these breaks. In another example, the user may use the interface control 844 to remove only the second period of idle time because the user forgot to stop the timer during a lunch break between 12:00 PM and 1:00 PM, but was speaking with a colleague about ideas for resolving the task between 10:30 AM and 10:50 AM. The system 400 may update the detailed report 840 in the interface 830 based on any time removal operations performed using the interface controls 842, 844, and 850.

In addition, the interface 830 includes an interface control 860 that enables a user to enter the tracked time. The interface control 860 causes the tracked time currently displayed to be entered for tracking, reporting, invoicing, or any other activities performed using the tracked time.

Figure 9:
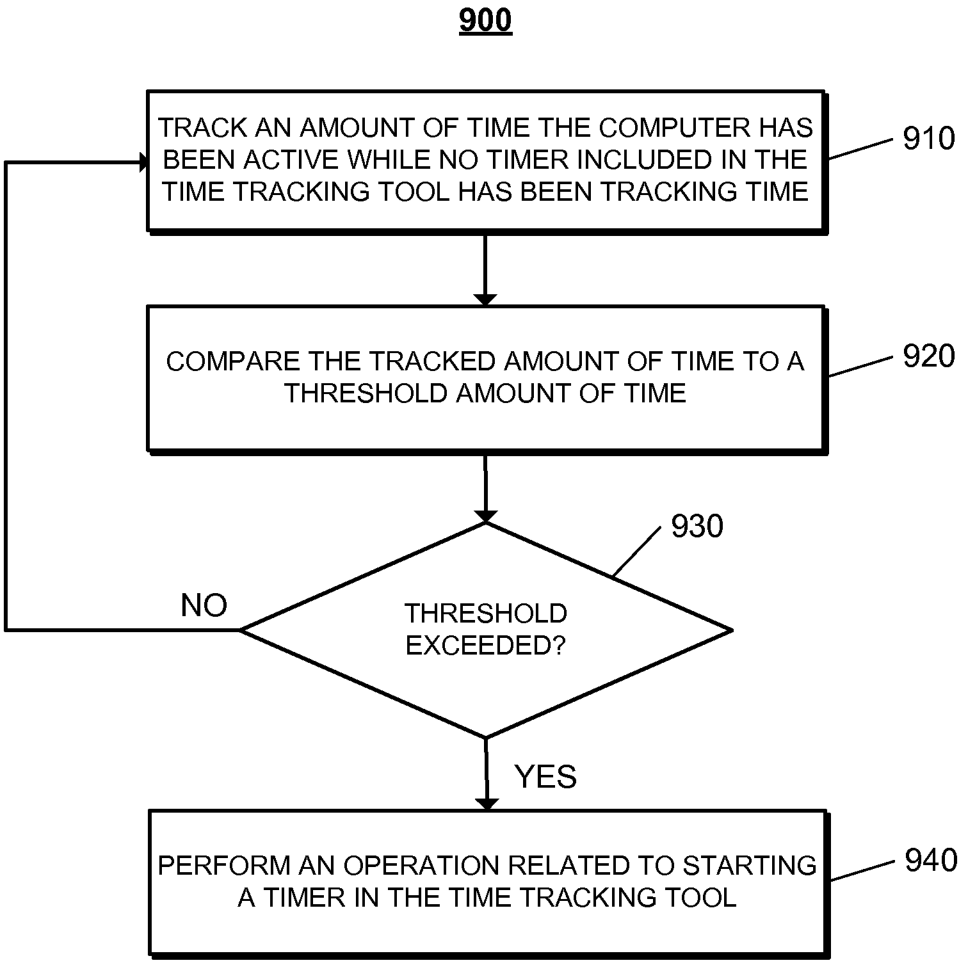

FIG. 9 illustrates a process 900 for performing an operation related to starting a timer based on active time of a computer. The operations of the process 900 are described generally as being performed by the system 400. The operations of the process 900 may be performed by one of the components of the system 400 (e.g., the tracking system 405, the user system 406, or the user system 407) or may be performed by a combination of the components of the system 400. In some implementations, operations of the process 900 may be performed by one or more processors included in one or more electronic devices.

The system 400 tracks an amount of time the computer has been active while no timer included in the time tracking tool has been tracking time (910). For instance, the system 400 detects that the computer operating the time tracking tool is in an active state (e.g., is receiving user input through a keyboard, mouse, etc.) while no timer is tracking time and measures the length of time the computer remains in the active state while no timer is tracking time. The system 400 may reset the tracked amount of time when the computer becomes idle or a timer is started. The system 400 may only monitor activity of the computer when a timer in the time tracking tool is not tracking time.

The system 400 compares the tracked amount of time to a threshold amount of time (920). For instance, the system 400 may access a threshold value from electronic storage and compare the threshold value to the tracked or measured amount of time the computer has been in the active state while no timer is tracking time.

The system 400 determines whether the threshold amount of time has been exceeded based on the comparison (930). For example, the system 400 determines whether the comparison reveals that the computer has been in the active state while no timer is tracking time for more or less than the threshold amount of time. In response to a determination that the threshold amount of time has not been exceeded, the system 400 continues to track an amount of time the computer has been active while no timer included in the time tracking tool has been tracking time.

The system 400 performs an operation related to starting a timer in the time tracking tool in response to a determination that the threshold amount of time has been exceeded (940). For instance, the system 400 may provide an alert to a user of the time tracking tool to start a timer, automatically start a timer, or record the period of active computer usage where no time was tracked for later reporting or handling. In implementations in which the system 400 automatically starts a timer, the system 400 may automatically start the timer at the point in which the threshold is determined to have been exceeded. The system 400 also may automatically start the timer to include the time tracked while the computer was active during the threshold amount of time such that the timer is effectively started at the point where the computer became active.

Figure 10:
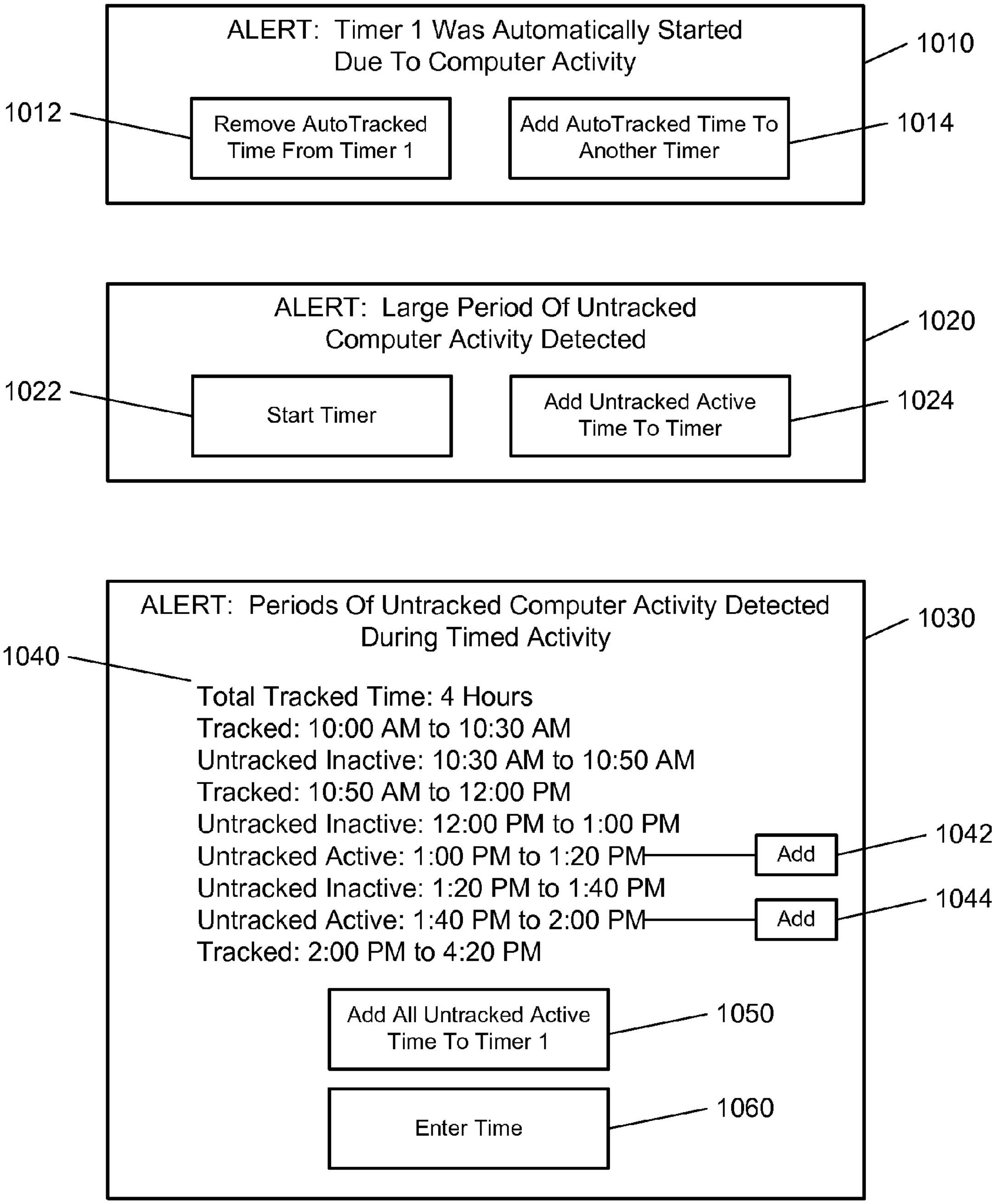

FIG. 10 illustrates example user interfaces that may be displayed in performing an operation related to starting a timer. The interface 1010 may be displayed to a user when the system 400 automatically starts a timer in response to a determination that a threshold amount of time has been exceeded by a tracked amount of time the computer has been active while no timer has been tracking time. The interface 1010 includes an alert to indicate that the system 400 automatically started the timer due to activity of the computer while the timer was not tracking time.

The system 400 may automatically start a new timer to track the active computer time. In some implementations, the system 400 may automatically start an existing timer in the time tracking tool. The system may select which existing timer in the time tracking tool to start based on one or more rules. For instance, the system 400 may select the most recently used timer to automatically start.

The system 400 also may analyze the computer activity being undertaken by the user and select a timer that most closely matches the computer activity based on the analysis. For example, the system 400 may determine that the computer is receiving user input for an application that relates handling a particular type of task. In this example, the system 400 may compare the particular type of task to timer description information in an attempt to identify a timer tracking time associated with the particular type of task. When the system 400 identifies a timer tracking time associated with the particular type of task, the system 400 selects the identified timer to automatically start to the extent other timers do not also relate to the particular type of tasks. When the system 400 does not identify a timer tracking time associated with the particular type of task or identifies multiple timers tracking time associated with the particular type of task such that it is ambiguous as to which timer the activity pertains, the system 400 may automatically start a new timer and ask the user to assign the time to the appropriate timer or provide timer description information if the activity relates to a new task.

The interface 1010 also includes an interface control 1012 that enables a user to remove automatically tracked time from the timer. For instance, when the system 400 automatically starts the timer, the system 400 also may track the time when the timer was automatically started. By tracking the automatic start point, the system 400 allows a user to easily remove any automatically tracked time that is not appropriate. This may occur when detected computer activity was the user using the computer for personal purposes and not actually working on a task.

The interface 1010 includes an interface control 1014 that allows a user to add the automatically tracked time to another timer. For example, when the system 400 uses a new timer in automatically tracking time, the interface control 1014 enables the user to move the automatically tracked time from the new timer to an existing timer related to the task on which the user was working. In another example, when the system 400 selects an inappropriate existing timer in automatically tracking time, the interface control 1014 enables the user to move the automatically tracked time from the inappropriate existing timer to an appropriate existing timer related to the task on which the user was working. The time is removed from the inappropriate existing timer and added to the appropriate existing timer so that the work on each task is tracked appropriately for the time spent.

The interface 1020 may be displayed to a user to alert the user that the time tracking tool may not be properly tracking time. The interface 1020 includes an alert to indicate that the system 400 has detected a relatively long period of computer activity while no timer has been tracking time. The interface 1020 may be displayed as a pop-up message on the computer operating the time tracking tool. The interface 1020 also may be part of an electronic message (e.g., electronic mail message, instant message, text message, etc.) sent to the user logged into the time tracking tool.

The interface 1020 includes interface controls 1022 and 1024 that enable a user to control start a timer. The interface control 1022 allows a user to start a timer at the current time. The interface control 1024 allows a user to add the untracked active time to a timer to allow the user to capture all of the untracked computer activity in a timer.

The interface 1030 may be displayed to a user when the user is entering time tracked by a timer and the system 400 determines that periods of untracked activity exist during the tracked time period (e.g., between the first start time and the last end time). The interface 1030 includes an alert to indicate that the system 400 detected periods of untracked computer activity during the time tracked by the timer.

The interface 1030 also provides a detailed report 1040 of the computer activity during the period of time tracked by the timer and enables the user to add periods of untracked computer activity. The detailed report 1040 shows the total tracked time as four hours and identifies three periods of tracked time, three periods of untracked time during which the computer was idle, and two periods of untracked time during which the computer was active.

The interface 1030 further includes interface controls 1042, 1044, and 1050 that enable a user to add periods of untracked time where the computer was active. Adding the untracked active time periods upon time entry essentially acts as a retroactive starting of the timer during the periods of active computer time.

The interface control 1042 enables the user to add the first period of untracked active computer time and the interface control 1044 enables the user to add the second period of untracked active computer time. The interface control 1050 enables the user to easily add all of the periods of untracked active computer time (e.g., the first and second periods of untracked active computer time) without having to individually add each period of untracked active computer time. In the example shown in FIG. 10, the user may use the interface control 1050 to add all of the periods of untracked active computer time when the user was actively working during the identified periods of time, but inadvertently forgot to start the timer. In another example, the user may use the interface control 1042 to add only the second period of untracked active computer time because the user forgot to start the timer after returning from a lunch break between 12:00 PM and 1:00 PM, but was using the computer for personal purposes between 1:40 PM and 2:00 PM. The system 400 may update the detailed report 1040 in the interface 1030 based on any time addition operations performed using the interface controls 1042, 1044, and 1050.

In addition, the interface 1030 includes an interface control 1060 that enables a user to enter the tracked time. The interface control 1060 causes the tracked time currently displayed to be entered for tracking, reporting, invoicing, or any other activities performed using the tracked time.

Figure 11:
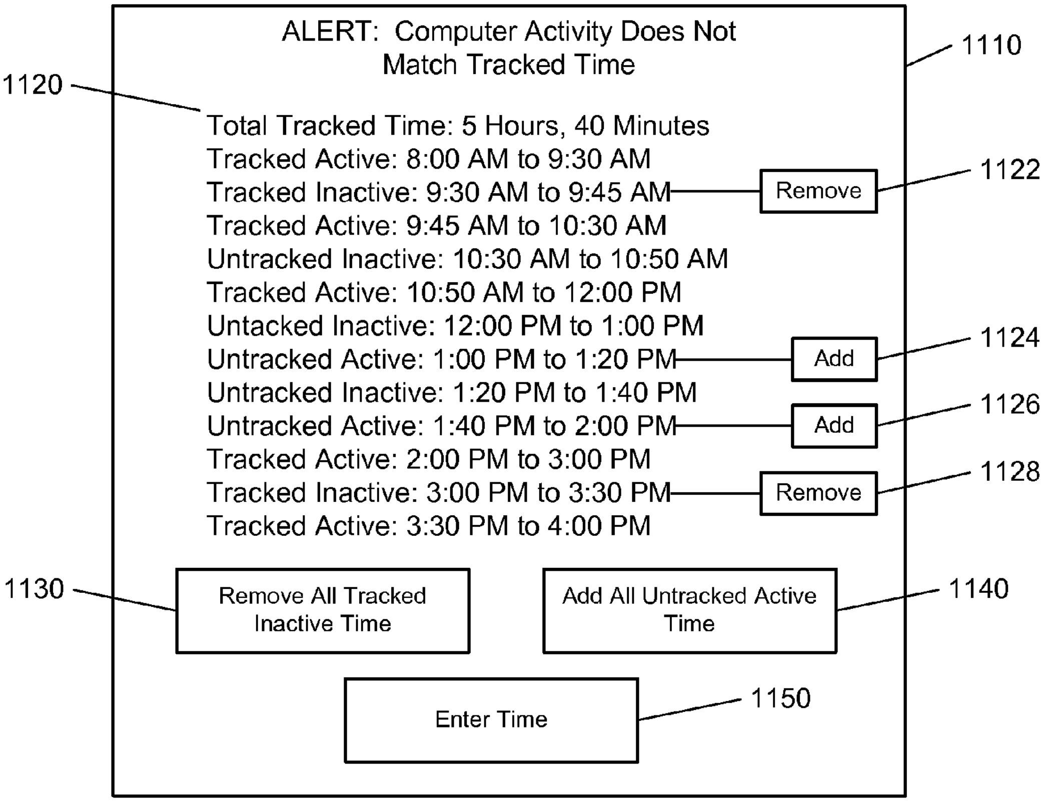

FIG. 11 illustrates an example user interface 1110 that may be displayed in performing an operation related to entering time based on tracked idle and active time of a computer during a period that includes time tracked by a timer. The interface 1110 may be displayed to a user when the user is entering time tracked by a timer and the system 400 determines that periods of untracked activity and tracked inactivity exist during the tracked time period (e.g., between the first start time and the last end time). The interface 1110 includes an alert to indicate that the system 400 detected a mismatch between monitored computer activity and time tracked by the timer.

The interface 1110 provides a detailed report 1120 of the computer activity during the period of time tracked by the timer and enables the user to add periods of untracked computer activity and remove periods of tracked computer inactivity. The detailed report 1120 shows the total tracked time as five hours, forty minutes and identifies five periods of tracked time where the computer was actively being used, two periods of tracked time where the computer was idle, three periods of untracked time where the computer was idle, and two periods of untracked time where the computer was actively being used.

The interface 1110 includes interface controls 1122, 1128, and 1130 that enable a user to remove periods during the total tracked time where the computer was idle. Removing the inactive time periods upon time entry essentially acts as a retroactive stopping of the timer during the periods of idle computer time.

The interface control 1122 enables the user to remove the first period of idle computer time that was tracked by the timer and the interface control 1128 enables the user to remove the second period of idle computer time that was tracked by the timer. The interface control 1130 enables the user to easily remove all of the periods of idle computer time that was tracked by the timer (e.g., the first and second periods of idle computer time) without having to individually remove each period of idle computer time. The system 400 may update the detailed report 1120 in the interface 1110 based on any time removal operations performed using the interface controls 1122, 1128, and 1130.

The interface 1110 further includes interface controls 1124, 1126, and 1140 that enable a user to add periods of untracked time where the computer was active. Adding the untracked active time periods upon time entry essentially acts as a retroactive starting of the timer during the periods of active computer time.

The interface control 1124 enables the user to add the first period of untracked active computer time and the interface control 1126 enables the user to add the second period of untracked active computer time. The interface control 1140 enables the user to easily add all of the periods of untracked active computer time (e.g., the first and second periods of untracked active computer time) without having to individually add each period of untracked active computer time. The system 400 may update the detailed report 1120 in the interface 1110 based on any time addition operations performed using the interface controls 1124, 1126, and 1140.

In addition, the interface 1110 includes an interface control 1150 that enables a user to enter the tracked time. The interface control 1150 causes the tracked time currently displayed to be entered for tracking, reporting, invoicing, or any other activities performed using the tracked time. The currently displayed tracked time may account for any time removal operations performed using the interface controls 1122, 1128, and 1130 and any time addition operations performed using the interface controls 1124, 1126, and 1140.

Figure 12:
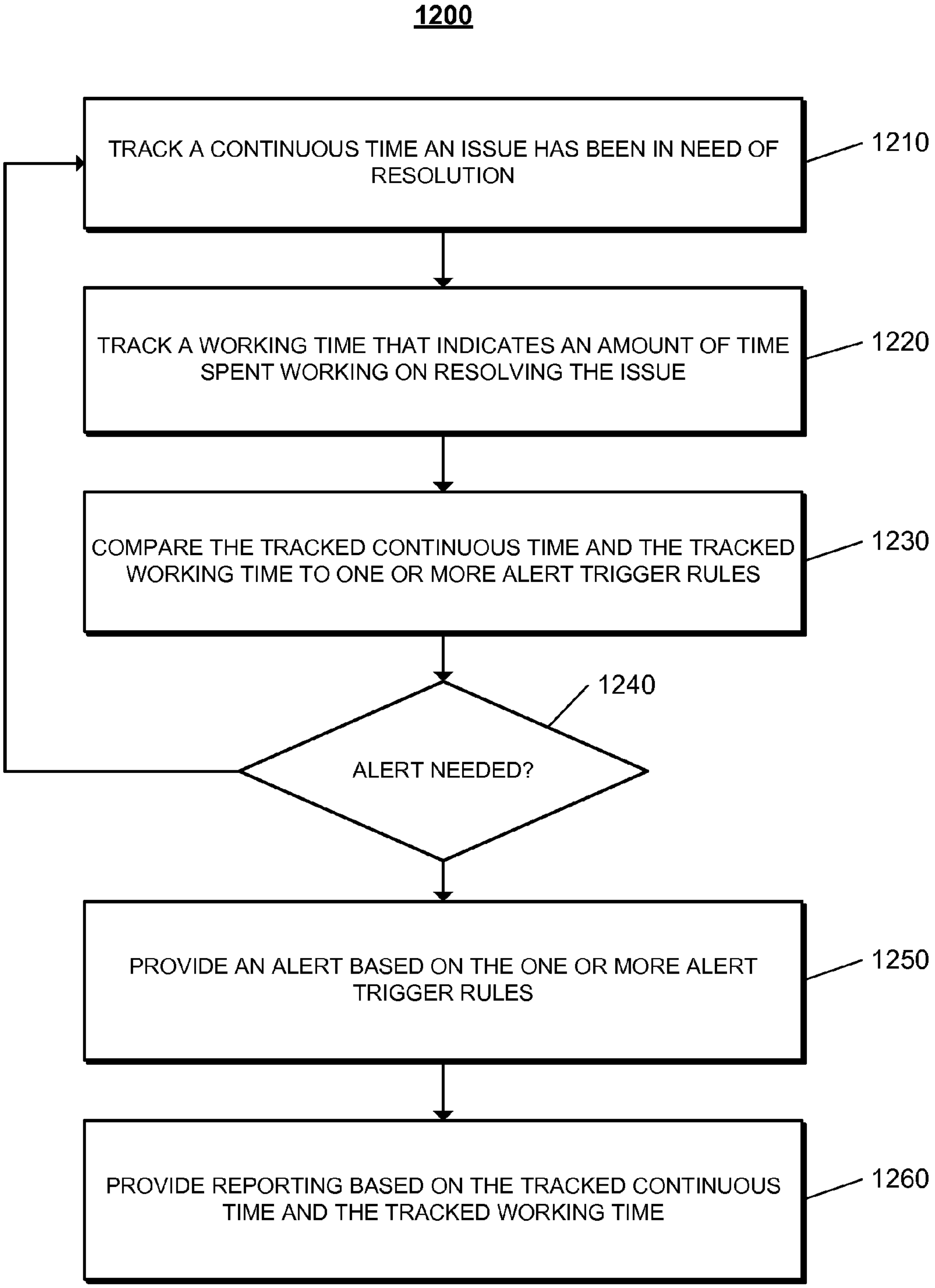

FIG. 12 illustrates a process 1200 for tracking continuous time and working time for an issue. The operations of the process 1200 are described generally as being performed by the system 400. The operations of the process 1200 may be performed by one of the components of the system 400 (e.g., the tracking system 405, the user system 406, or the user system 407) or may be performed by a combination of the components of the system 400. In some implementations, operations of the process 1200 may be performed by one or more processors included in one or more electronic devices.

The system 400 tracks a continuous time an issue has been in need of resolution (1210). For example, the system 400 begins tracking the continuous time when an issue is initiated. In this example, the system 400 may track the time from when the issue is added to the time tracking system. The issue may be added to the time tracking system when a client sends a request (e.g., a client submits a help ticket to an IT service) or a user or employee proactively initiates a new issue. The system 400 may track the continuous time by setting a timer that runs continuously from the time when the issue is initiated or the system 400 may track the continuous time by marking the time when the issue is initiated and monitoring the marked time relative to the current time.

The system 400 tracks a working time that indicates an amount of time spent working on resolving the issue (1220). For instance, the system 400 may track the amount of time users or employees have logged as working on the issue using a time tracking tool. The working time reflects the amount of time a person has been working to resolve the issue. The working time may track work performed by individual users or may reflect total work performed by a group (e.g., all) of users working on the issue.

The system 400 compares the tracked continuous time and the tracked working time to one or more alert trigger rules (1230). For instance, the system 400 may identify an issue to evaluate and compare the tracked continuous time and/or the tracked working time to a set of one or more rules. The one or more rules may specify that certain actions are to occur based on particular continuous and working times. For example, the system 400 may compare the tracked continuous time and the tracked working time to one or more threshold values defined by the one or more rules. The system 400 may perform computations on the tracked continuous time and the tracked working time to further evaluate the amount of continuous time an issue has been in need of resolution relative to an amount of time users have been working on the issue.

Figure 13:
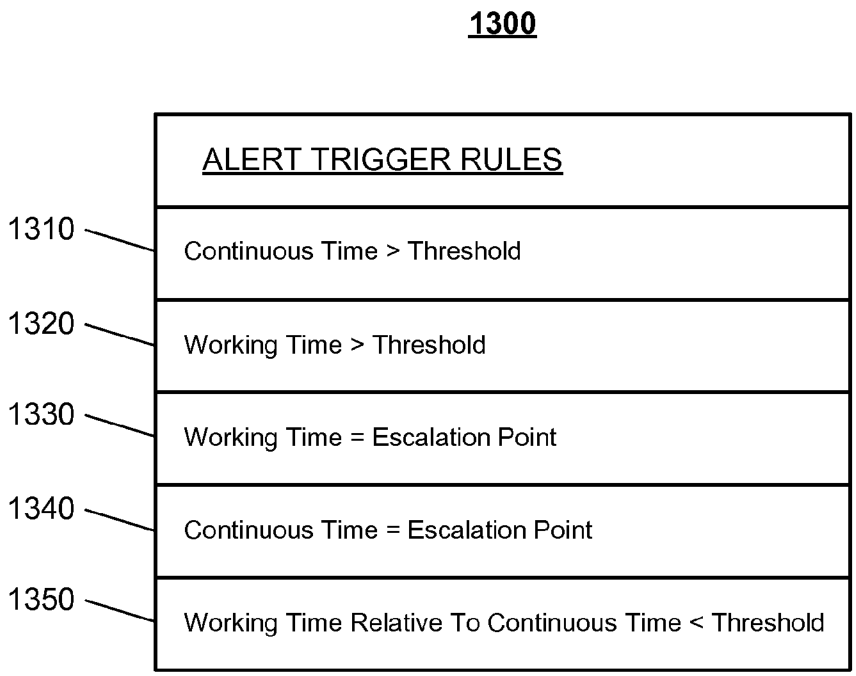
FIG. 13 illustrates example alert trigger rules.

FIG. 13 illustrates a set of example alert trigger rules 1300. The rule 1310 defines that an alert should be provided when the tracked continuous time exceeds a threshold amount of time. The threshold amount of time may be set by client deadlines/demands or may be set as an ordinary level of service provided by the company servicing the issue. In evaluating the rule 1310, the system 400 accesses the tracked continuous time for an issue, accesses a threshold amount of time set for the issue, and compares the tracked continuous time to the accessed threshold amount of time.

The rule 1320 defines that an alert should be provided when the tracked working time exceeds a threshold amount of time. The threshold amount of time may be set by client budgets (e.g., only a certain amount of time should be spent in resolving the issue) or may be set by the company servicing the issue. In evaluating the rule 1320, the system 400 accesses the tracked working time for an issue, accesses a threshold amount of time set for the issue, and compares the tracked working time to the accessed threshold amount of time.

The rule 1330 defines that an alert should be provided when the tracked working time reaches an escalation point. The escalation point may be set by the company servicing the issue to indicate when an issue should be escalated to an external service company or another employee. In evaluating the rule 1330, the system 400 accesses the tracked working time for an issue, accesses an escalation point set for the issue, and compares the tracked working time to the accessed escalation point.

The rule 1340 defines that an alert should be provided when the tracked continuous time reaches an escalation point. The escalation point may be set by the company servicing the issue to indicate when an issue should be escalated to an external service company. In evaluating the rule 1340, the system 400 accesses the tracked continuous time for an issue, accesses an escalation point set for the issue, and compares the tracked continuous time to the accessed escalation point.

The rule 1350 defines that an alert should be provided when the tracked working time relative to the tracked continuous time is less than a threshold. The threshold may be set by the company servicing the issue to ensure work is being spent in resolution of an issue. In evaluating the rule 1350, the system 400 accesses the tracked working time for an issue, accesses the tracked continuous time for the issue, and computes a percentage of time that has been spent working on the issue by dividing the tracked working time by the tracked continuous time. The system 400 then accesses a threshold percentage and compares the computed percentage to the accessed threshold percentage.

The alert trigger rules 1300 may include many other types of rules that evaluate tracked continuous time and tracked working time. The rules may have a variety of different threshold values and may be defined generally to apply to all issues or may be defined to apply to specific issues.

Referring again to FIG. 12, the system 400 determines whether an alert is needed based on the comparison (1240). For example, the system 400 determines whether criteria specified by the one or more rules warrants provision of an alert. In this example, the one or more rules may specify that provision of an alert is warranted when the tracked continuous time and/or the tracked working time reaches a threshold.

In the example shown in FIG. 13, the system 400 determines that an alert is needed based on the rule 1310 when the comparison of the tracked continuous time to the accessed threshold amount of time reveals that the tracked continuous time exceeds the accessed threshold amount. Similarly, the system 400 determines that an alert is needed based on the rule 1320 when the comparison of the tracked working time to the accessed threshold amount of time reveals that the tracked working time exceeds the accessed threshold amount. Further, the system 400 determines that an alert is needed based on the rule 1330 when the comparison of the tracked working time to the escalation point reveals that the tracked working time has reached the escalation point. The system 400 determines that an alert is needed based on the rule 1340 when the comparison of the tracked continuous time to the escalation point reveals that the tracked continuous time has reached the escalation point. In addition, the system 400 determines that an alert is needed based on the rule 1350 when the comparison of the computed percentage to the accessed threshold percentage reveals that the computed percentage is below the threshold percentage.

Referring again to FIG. 12, the system 400 continues to track the continuous time and the working time without providing an alert in response to a determination that an alert is not needed. For instance, the system 400 repeats performance of operations 1210 to 1240.

The system 400 provides an alert based on the one or more alert trigger rules in response to a determination that an alert is needed (1250). For instance, the system 400 may provide an alert to a user of the time tracking tool or a supervisor managing the issue being handled. The system 400 may use any of the techniques described throughout this disclosure to provide an alert.

Figure 14:
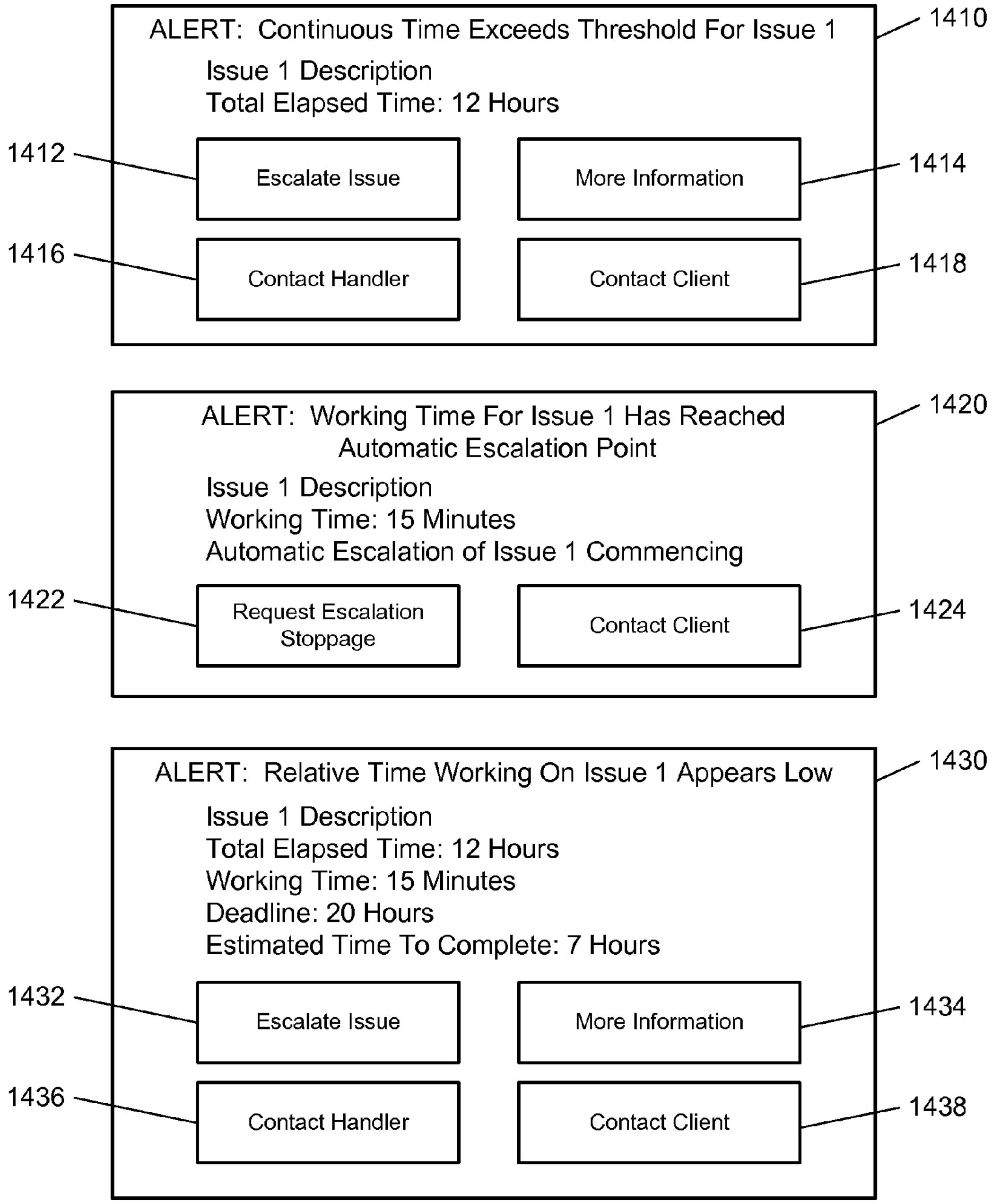

FIG. 14 illustrates example user interfaces that may be displayed in providing an alert based on the one or more alert trigger rules. The interface 1410 may be displayed to a user when the system 400 determines that the tracked continuous time exceeds the accessed threshold amount specified in the rule 1310. The interface 1410 includes an alert to indicate that the system 400 has determined that the continuous time for an issue exceeds a threshold amount. The interface 1410 also includes a description of the issue and an indication of the tracked continuous time.

The interface 1410 includes interface controls 1412, 1414, 1416, and 1418 that enable a user (e.g., a supervisor) to facilitate handling of the issue based on the alert. For example, the interface control 1412 enables a user to escalate the issue. In this example, the system 400 may receive input using the interface control 1412 and, in response to the input, automatically escalate the issue to an external services company. The system 400 may automatically escalate the issue by removing the issue from the user/employee currently handling the issue (e.g., removing the issue from the user/employee's task list and sending the user/employee a message to indicate that the issue has been escalated) and sending, to the external services company, a message requesting the external services company to handle the issue. For instance, the system 400 may automatically page a secondary or a next level tier employee. The system 400 also may receive input using the interface control 1412 and, in response to the input, display another interface that assists the user perceiving the alert to escalate the issue. For instance, the system 400 may display an interface with contact options for the external services company and details related to the issue.

The interface control 1414 enables a user to request more information regarding the issue. The system 400 may receive input using the interface control 1414 and, in response to the input, display another interface that provides more information related to the issue. For instance, the system 400 may display an interface with information identifying the one or more users handling the issue, an indication of the working time spent by the one or more users in handling the issue, and an indication of any progress or communications exchanged in handling the issue. The additional information may include any of the information described throughout this disclosure as being tracked by the time tracking tool or provided in a report.

The interface control 1416 enables a user to contact the user/employee currently handling the issue. The system 400 may receive input using the interface control 1416 and, in response to the input, automatically contact the handling user/employee to inquire about the status of the issue. The system 400 may automatically send an electronic message (e.g., electronic mail message, an instant message, a text message, etc.) to the handling user/employee that requests the handling user/employee to provide status related to the issue. The automatically sent electronic message may be configured such that responses to the automatically sent electronic message are provided to the user that activated the interface control 1416. The system 400 also may receive input using the interface control 1416 and, in response to the input, display another interface that assists the user perceiving the alert to contact the handling user/employee. For instance, the system 400 may display an interface with contact options for the handling user/employee or an interface that enables the user perceiving the alert to compose and send an electronic message to the handling user/employee (e.g., a compose new electronic mail message interface addressed to the handling user/employee).

The interface control 1418 enables a user to contact the client associated with the issue. The system 400 may receive input using the interface control 1418 and, in response to the input, display another interface that assists the user perceiving the alert to contact the client. For instance, the system 400 may display an interface with contact options for the client or an interface that enables the user perceiving the alert to compose and send an electronic message to the client (e.g., a compose new electronic mail message interface addressed to the client).

The interface 1420 may be displayed to a user when the system 400 determines that the tracked working time has reached an escalation point specified in the rule 1330. The interface 1420 includes an alert to indicate that the system 400 has determined that the working time for an issue has reached an escalation point. The interface 1420 also includes a description of the issue, an indication of the tracked working time, and an indication that escalation of the issue is commencing.

The interface 1420 includes interface controls 1422 and 1424 that enable a user (e.g., a supervisor) to facilitate handling of the issue based on the alert. For example, the interface control 1422 enables a user to request stoppage of the escalation of the issue. In this example, the system 400 may receive input using the interface control 1422 and, in response to the input, automatically request stoppage of the escalation of the issue. The system 400 may automatically request stoppage of the escalation of the issue by sending a message requesting the person handling the escalation to stop the escalation. The system 400 also may automatically stop or delay the escalation in response to the input using the interface control 1422. The system 400 further may receive input using the interface control 1422 and, in response to the input, display another interface that assists the user perceiving the alert in requesting stoppage of the escalation. For instance, the system 400 may display an interface with contact options for the person handling the escalation or an interface that enables the user perceiving the alert to compose and send an electronic message to the person handling the escalation that requests stoppage of the escalation and provides a reason why the escalation should be stopped (e.g., a compose new electronic mail message interface addressed to the person handling the escalation). A user may use the interface control 1422 to request stoppage of the escalation when the user is very close to resolving the issue or has specific experience relevant to handling the issue.

The interface control 1424 enables a user to contact the client associated with the issue to report the escalation of the issue to the client. The system 400 may receive input using the interface control 1424 and, in response to the input, display another interface that assists the user perceiving the alert to contact the client. For instance, the system 400 may display an interface with contact options for the client or an interface that enables the user perceiving the alert to compose and send an electronic message to the client (e.g., a compose new electronic mail message interface addressed to the client).

The interface 1430 may be displayed to a user when the system 400 determines that the relative amount of time working on an issue appears low as compared to the continuous time the issue has been in need of resolution. For instance, the system 400 determines that a percentage of tracked working time divided by tracked continuous time exceeds the threshold percentage specified in the rule 1350. The interface 1430 includes an alert to indicate that the system 400 has determined that the relative amount of time working on an issue appears low. The interface 1430 also includes a description of the issue, an indication of the tracked continuous time, an indication of the tracked working time, a deadline for resolution of the issue, and an estimated time for resolving the issue.

The interface 1430 includes interface controls 1432, 1434, 1436, and 1438 that enable a user (e.g., a supervisor) to facilitate handling of the issue based on the alert. The interface controls 1432, 1434, 1436, and 1438 may be similar to the interface controls 1412, 1414, 1416, and 1418, respectively.

Referring again to FIG. 12, the system 400 provides reporting based on the tracked continuous time and the tracked working time (1260). For example, the system 400 may generate a report that identifies one or more issues with the tracked continuous time and the tracked working time associated with each of the one or more issues. In this example, the system 400 may display the generated report, send the generated report to one or more users in one or more electronic messages, and/or store, in electronic storage, the generated report for servicing later requests. The system 400 also may include other information in the generated report, such as identification information for users that are working in resolving the issue and an indication of whether the issue is resolved or unresolved. The generated report may include any of the information described throughout this disclosure as being tracked by the time tracking tool.

FIG. 15 illustrates an example of a report 1500 provided based on the tracked continuous time and the tracked working time. The report 1500 includes an issue column 1510, a continuous time column 1520, a working time column 1530, and a user column 1540. The issue column 1510 includes data identifying an issue and the continuous time column 1520 includes data indicating the tracked continuous time the issue identified in the issue column 1510 has been (or was) in need of resolution. The working time column 1530 includes data indicating the tracked working time spent in resolving the issue identified in the issue column 1510. The tracked working time indicates the total amount of tracked working time spent on the issue by all users/employees. The user column 1540 identifies one or more users/employees that are working on resolving the issue. When multiple users are working on resolving the issue, the user column 1540 includes an amount of working time each individual user has spent in resolving the issue. In generating the report 1500, the system 400 may use the ticket reference number as the connecting field to identify all the users working on same issue.

The report 1500 includes multiple rows 1550, 1552, 1554, 1556, 1558, and 1560 that each corresponds to a particular issue. The row 1550 corresponds to a first issue and indicates that a continuous time for the first issue is forty-eight hours, a working time for the first issue is two hours, and that user one is working on resolving the first issue. The row 1552 corresponds to a second issue and indicates that a continuous time for the second issue is four hours, a working time for the second issue is two hours, and that user one is working on resolving the second issue. The row 1554 corresponds to a third issue and indicates that a continuous time for the third issue is thirty minutes, a working time for the third issue is thirty minutes, and that user two is working on resolving the third issue. The row 1556 corresponds to a fourth issue and indicates that a continuous time for the fourth issue is twelve hours, a working time for the fourth issue is twenty-four hours, that user one has spent eight hours working on resolving the fourth issue, that user two has spent eight hours working on resolving the fourth issue, and that user three has spent eight hours working on resolving the fourth issue. The row 1558 corresponds to a fifth issue and indicates that a continuous time for the fifth issue is seven days, a working time for the fifth issue is six hours, that user four has spent four hours working on resolving the fifth issue, and that user five has spent two hours working on resolving the fifth issue. The row 1560 corresponds to a sixth issue and indicates that a continuous time for the sixth issue is forty-eight hours, a working time for the sixth issue is zero minutes, and that user five is scheduled to work on resolving the sixth issue.

Figure 16:
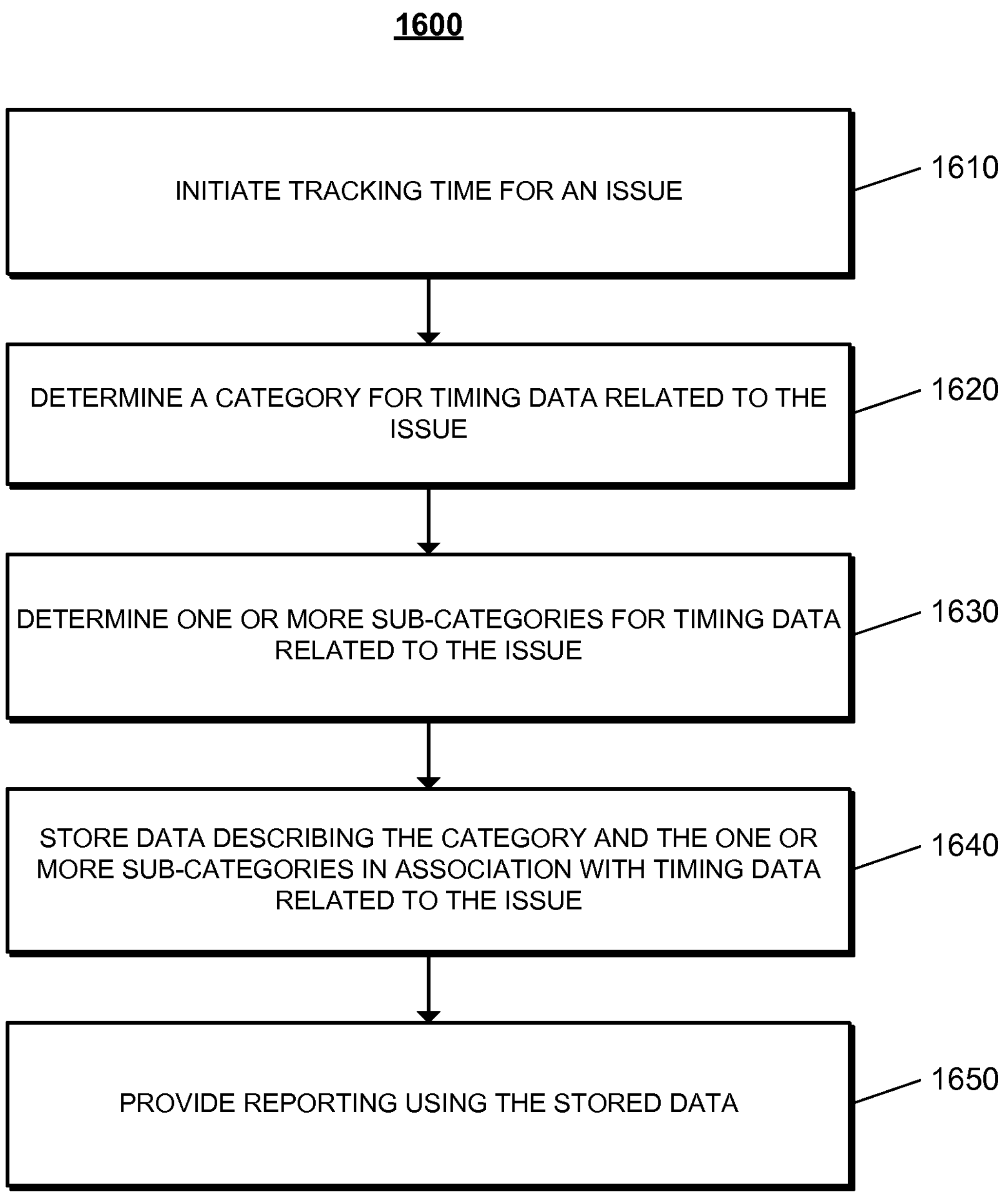

FIG. 16 illustrates a process 1600 for tracking category and sub-category data for time tracked in resolving an issue. The operations of the process 1600 are described generally as being performed by the system 400. The operations of the process 1600 may be performed by one of the components of the system 400 (e.g., the tracking system 405, the user system 406, or the user system 407) or may be performed by a combination of the components of the system 400. In some implementations, operations of the process 1600 may be performed by one or more processors included in one or more electronic devices.

The system 400 initiates tracking time for an issue (1610). For instance, the system 400 may open a new issue for time tracking to make the new issue eligible for users (e.g., employees) to begin tracking time spent in resolving the issue. Each user assigned to resolve the issue may then begin tracking time spent in resolving the issue using a timer included in a time tracking tool.

The system 400 determines a category for timing data related to the issue (1620). For example, the system 400 determines a category assigned to a timer tracking time spent in resolving the issue. In this example, the category may be assigned to the timer based on user input, such as selection of a category from a pre-defined list control using an interface similar to those described above with respect to FIGS. 2 and 3. The system 400 also may automatically determine a category for tracked timing data based on an identity of the user that is tracking time and/or activity performed by the user while the time is being tracked. The category data may be specific to periods of tracked time and the category may be different for different users or for different periods of time tracked by the same user.

The system 400 determines one or more sub-categories for timing data related to the issue (1630). For example, the system 400 determines a sub-category assigned to a timer tracking time spent in resolving the issue. In this example, the sub-category may be assigned to the timer based on user input, such as selection of a sub-category from a pre-defined list control using an interface similar to those described above with respect to FIGS. 2 and 3. The system 400 also may automatically determine a sub-category for tracked timing data based on an identity of the user that is tracking time and/or activity performed by the user while the time is being tracked. The sub-category data may be specific to periods of tracked time and the sub-category may be different for different users or for different periods of time tracked by the same user.

The system 400 may restrict the sub-categories available for selection based on the selected category. Multiple sub-categories may be available for a particular category and the sub-categories for the particular category may vary for specific periods of tracked time.

The system 400 stores data describing the category and the one or more sub-categories in association with timing data related to the issue (1640). For instance, the system 400 stores tracked timing data in association with the category and the one or more sub-categories corresponding to the tracked timing data. The system 400 may store the tracked timing, category, and sub-category data in a database that the system 400 may query to generate reports.

The system 400 provides reporting using the stored data (1650). For example, the system 400 may generate a report that identifies one or more issues and provides timing data and/or statistics derived using the category and the one or more sub-categories associated with the timing data for the one or more issues. In this example, the system 400 may display the generated report, send the generated report to one or more users in one or more electronic messages, and/or store, in electronic storage, the generated report for servicing later requests. The generated report may include any of the information described throughout this disclosure as being tracked by the time tracking tool.

Figure 17:
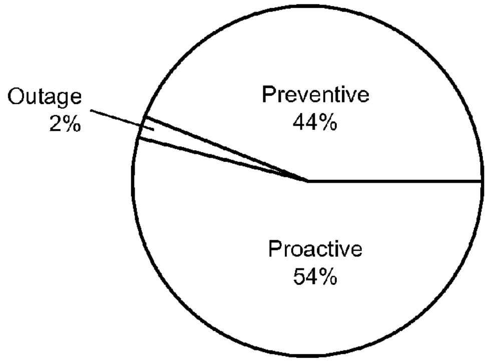

FIG. 17 illustrates an example of a report 1700 provided based on a category and one or more sub-categories stored in association with timing data related to the issue. The report 1700 shows distribution of incidents according to category. Specifically, the report 1700 shows timing data and statistics based on categories that indicate whether time tracked in performing the function (or resolving the issue) was associated with a proactive category, a preventive category, or an outage category. The report 1700 further shows statistics based on sub-categories that indicate whether time tracked in performing the function (or resolving the issue) was completed by an internal team or escalated to an external services company.

Figure 18:
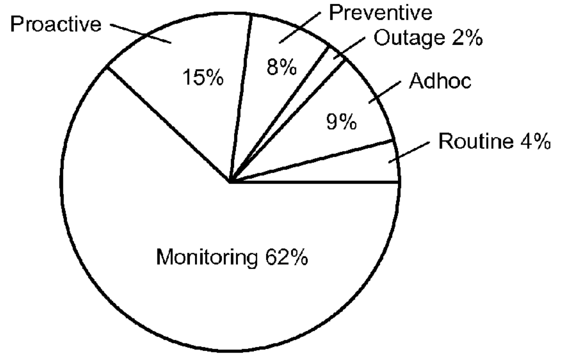

FIG. 18 illustrates an example of a report 1800 provided based on category data stored in association with timing data related to the issue. The report 1800 shows total time utilization according to category. Specifically, the report 1800 shows timing data and statistics based on categories that indicate whether time tracked in performing the function (or resolving the issue) was associated with a proactive category, a preventive category, an outage category, an adhoc category, a routine category, or a monitoring category.

Figure 19:
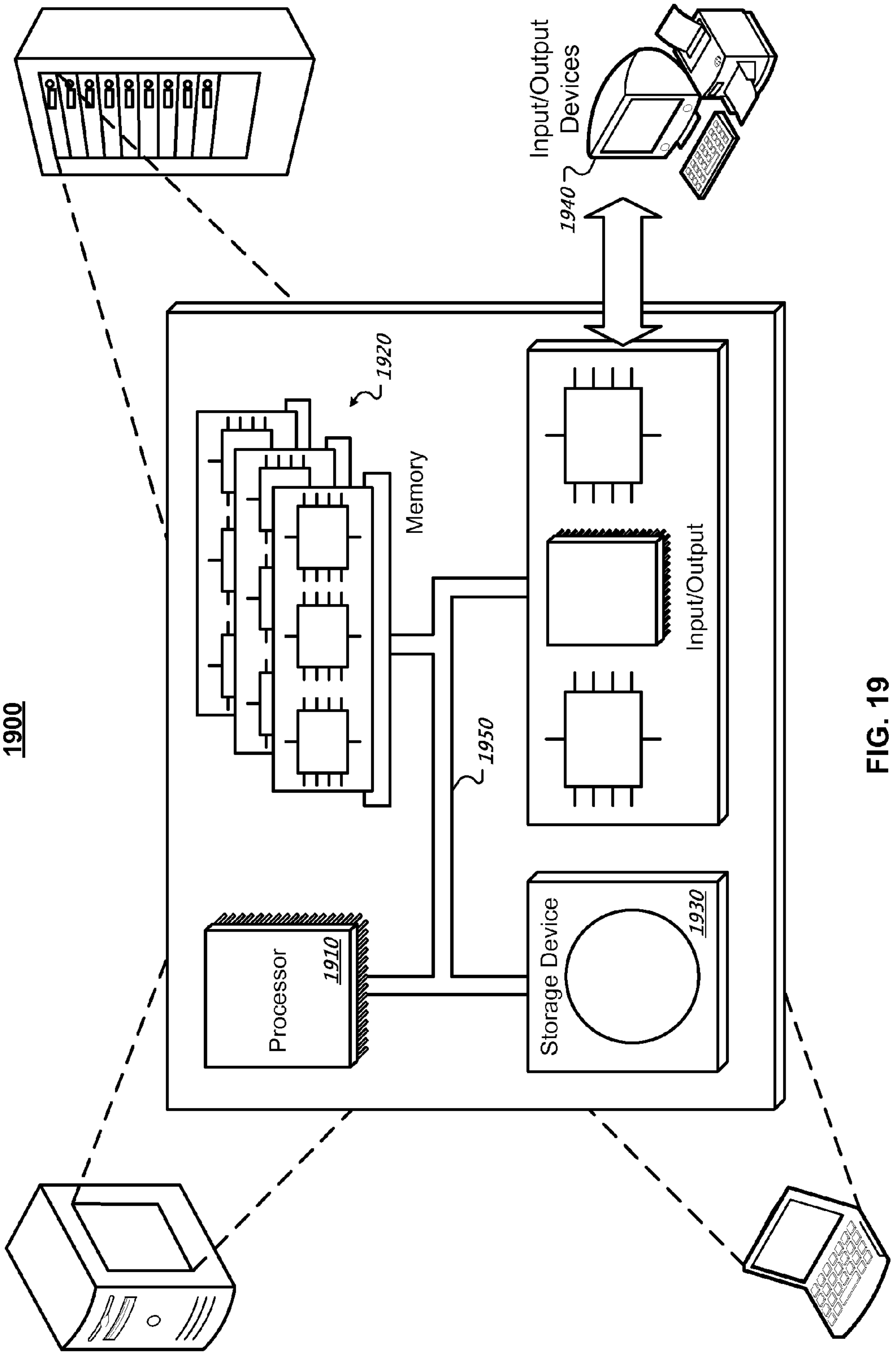

FIG. 19 illustrates an example of a computer system 1900. The system 1900 includes a processor 1910, a memory 1920, a storage device 1930, and an input/output device 1940. Each of the components 1910, 1920, 1930, and 1940 are interconnected using a system bus 1950. The processor 1910 is capable of processing instructions for execution within the system 1900. In one implementation, the processor 1910 is a single-threaded processor. In another implementation, the processor 1910 is a multi-threaded processor. The processor 1910 is capable of processing instructions stored in the memory 1920 or on the storage device 1930 to display graphical information for a user interface on the input/output device 1940.

The memory 1920 stores information within the system 1900. In one implementation, the memory 1920 is a computer-readable medium. In another implementation, the memory 1920 is a volatile memory unit. In yet another implementation, the memory 1920 is a non-volatile memory unit.

The storage device 1930 is capable of providing mass storage for the system 1900. In one implementation, the storage device 1930 is a computer-readable medium. In various different implementations, the storage device 1930 may be a floppy disk device, a hard disk device, an optical disk device, or a tape device.

The input/output device 1940 provides input/output operations for the system 1900. In one implementation, the input/output device 1940 includes a keyboard and/or pointing device. In another implementation, the input/output device 1940 includes a display unit for displaying graphical user interfaces.

The features described can be implemented in digital electronic circuitry, or in computer hardware, or in combinations of computer hardware and firmware or software. The apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented on mobile and/or web technology devices. For instance, the features may be implemented on a smart phone or a portable computing device. The smart phone or portable computing device may include a touch screen interface.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for performing an operation related to a time tracking tool based on activity of a computer relative to status of the time tracking tool, the method comprising:

monitoring status of a time tracking tool configured to track time spent in completing one or more tasks by determining whether at least one timer included in the time tracking tool is tracking time;

in response to determining that the least one timer included in the time tracking tool is tracking time, storing time tracking tool status data indicating the status of the time tracking tool and a time period corresponding to the status as tracking time in association with data identifying the at least one timer that is active;

monitoring, by a tracking system, activity of a computer associated with the time tracking tool relative to the status of the time tracking tool, wherein monitoring activity of the computer includes monitoring keyboard input, mouse movements and/or whether the computer runs an application and/or performs an action;

in response to determining that the computer is being actively used, determining that the computer is in an active state and otherwise determining that the computer is in an idle state and storing the computer activity data that indicate the state of the computer and a time period corresponding to the state of the computer in association with the time tracking tool status data to represent the activity of the computer relative to the status of the time tracking tool;

evaluating the activity of the computer relative to the status of the time tracking tool with respect to one or more rules;

determining whether the activity of the computer relative to the status of the time tracking tool warrants performance of an operation related to the time tracking tool based on the evaluation, the determining comprising determining that a threshold amount of time has been exceeded by a first time period during which the computer activity data indicates that the computer was in an inactive state while the time tracking tool was tracking time and determining that a threshold amount of time has been exceeded by a second time period during which the computer activity data indicates that the computer was in an active state while the time tracking tool was not tracking time; and in response to a determination that the activity of the computer relative to the status of the time tracking tool warrants performance of an operation related to the time tracking tool, performing an operation related to the time tracking tool based on the activity of the computer relative to the status of the time tracking tool, the operation comprising providing an interface including an indication that during the first time period the computer was in an inactive state while the time tracking tool was tracking time, a control associated with the first time period that removes the first time period from the tracked time, an indication that during the second time period the computer was in an active state while the time tracking tool was not tracking time, and a control associated with the second time period that adds the second time period to the tracked time.

2. The method of claim 1 further comprising, in response to a determination that the activity of the computer relative to the status of the time tracking tool does not warrant performance of an operation related to the time tracking tool, continuing to monitor activity of the computer associated with the time tracking tool relative to the status of the time tracking tool.

3. The method of claim 1:

wherein monitoring status of the time tracking tool configured to track time spent in completing one or more tasks comprises monitoring whether or not a timer included in the time tracking tool has been tracking time;

wherein monitoring activity of the computer associated with the time tracking tool relative to the status of the time tracking tool comprises tracking an amount of time the computer has been idle while the timer included in the time tracking tool has been tracking time; and wherein evaluating the activity of the computer relative to the status of the time tracking tool with respect to one or more rules comprises comparing the tracked amount of time the computer has been idle while the timer included in the time tracking tool has been tracking time to a threshold amount of time.

4. The method of claim 1:

wherein monitoring status of the time tracking tool configured to track time spent in completing one or more tasks comprises monitoring whether or not any timer included in the time tracking tool has been tracking time;

wherein monitoring activity of the computer associated with the time tracking tool relative to the status of the time tracking tool comprises tracking, by the tracking system, an amount of time the computer has been active while no timer included in the time tracking tool has been tracking time; and wherein evaluating the activity of the computer relative to the status of the time tracking tool with respect to one or more rules comprises comparing the tracked amount of time the computer has been active while no timer included in the time tracking tool has been tracking time to the threshold amount of time.

5. The method of claim 1, wherein the threshold amount of time that the first time period is determined to exceed and the threshold amount of time that the second time period is determined to exceed are different threshold amounts.

6. The method of claim 1, wherein the interface includes an indication that during a third time period the computer was in an active state while the time tracking tool was tracking time.

7. The method of claim 1, wherein the interface includes an indication that during a third time period the computer was in an inactive state while the time tracking tool was not tracking time.

8. A system comprising:

one or more computers; and one or more storage devices storing instructions that are operable, when executed by the one or more computers, to cause the one or more computers to perform operations comprising:

monitoring status of a time tracking tool configured to track time spent in completing one or more tasks by determining whether at least one timer included in the time tracking tool is tracking time;

in response to determining that the least one timer included in the time tracking tool is tracking time, storing time tracking tool status data indicating the status of the time tracking tool and a time period corresponding to the status as tracking time in association with data identifying the at least one timer that is active;

monitoring, by a tracking system, activity of a computer associated with the time tracking tool relative to the status of the time tracking tool, wherein monitoring activity of the computer includes monitoring keyboard input, mouse movements and/or whether the computer runs an application and/or performs an action;

in response to determining that the computer is being actively used, determining that the computer is in an active state and otherwise determining that the computer is in an idle state and storing the computer activity data that indicate the state of the computer and a time period corresponding to the state of the computer in association with the time tracking tool status data to represent the activity of the computer relative to the status of the time tracking tool;

evaluating the activity of the computer relative to the status of the time tracking tool with respect to one or more rules;

determining whether the activity of the computer relative to the status of the time tracking tool warrants performance of an operation related to the time tracking tool based on the evaluation, the determining comprising determining that a threshold amount of time has been exceeded by a first time period during which the computer activity data indicates that the computer was in an inactive state while the time tracking tool was tracking time and determining that a threshold amount of time has been exceeded by a second time period during which the computer activity data indicates that the computer was in an active state while the time tracking tool was not tracking time; and in response to a determination that the activity of the computer relative to the status of the time tracking tool warrants performance of an operation related to the time tracking tool, performing an operation related to the time tracking tool based on the activity of the computer relative to the status of the time tracking tool, the operation comprising providing an interface including an indication that during the first time period the computer was in an inactive state while the time tracking tool was tracking time, a control associated with the first time period that removes the first time period from the tracked time, an indication that during the second time period the computer was in an active state while the time tracking tool was not tracking time, and a control associated with the second time period that adds the second time period to the tracked time.

9. The system of claim 8 the operations further comprising, in response to a determination that the activity of the computer relative to the status of the time tracking tool does not warrant performance of an operation related to the time tracking tool, continuing to monitor activity of the computer associated with the time tracking tool relative to the status of the time tracking tool.

10. The system of claim 8:

wherein monitoring status of the time tracking tool configured to track time spent in completing one or more tasks comprises monitoring whether or not a timer included in the time tracking tool has been tracking time;

wherein monitoring activity of the computer associated with the time tracking tool relative to the status of the time tracking tool comprises tracking an amount of time the computer has been idle while the timer included in the time tracking tool has been tracking time; and wherein evaluating the activity of the computer relative to the status of the time tracking tool with respect to one or more rules comprises comparing the tracked amount of time the computer has been idle while the timer included in the time tracking tool has been tracking time to a threshold amount of time.

11. A non-transitory computer-readable medium storing software comprising instructions executable by one or more computers which, upon such execution, cause the one or more computers to perform operations comprising:

monitoring status of a time tracking tool configured to track time spent in completing one or more tasks by determining whether at least one timer included in the time tracking tool is tracking time;

in response to determining that the least one timer included in the time tracking tool is tracking time, storing time tracking tool status data indicating the status of the time tracking tool and a time period corresponding to the status as tracking time in association with data identifying the at least one timer that is active;

monitoring, by a tracking system, activity of a computer associated with the time tracking tool relative to the status of the time tracking tool, wherein monitoring activity of the computer includes monitoring keyboard input, mouse movements and/or whether the computer runs an application and/or performs an action;

in response to determining that the computer is being actively used, determining that the computer is in an active state and otherwise determining that the computer is in an idle state and storing the computer activity data that indicate the state of the computer and a time period corresponding to the state of the computer in association with the time tracking tool status data to represent the activity of the computer relative to the status of the time tracking tool;

evaluating the activity of the computer relative to the status of the time tracking tool with respect to one or more rules;

determining whether the activity of the computer relative to the status of the time tracking tool warrants performance of an operation related to the time tracking tool based on the evaluation, the determining comprising determining that a threshold amount of time has been exceeded by a first time period during which the computer activity data indicates that the computer was in an inactive state while the time tracking tool was tracking time and determining that a threshold amount of time has been exceeded by a second time period during which the computer activity data indicates that the computer was in an active state while the time tracking tool was not tracking time; and in response to a determination that the activity of the computer relative to the status of the time tracking tool warrants performance of an operation related to the time tracking tool, performing an operation related to the time tracking tool based on the activity of the computer relative to the status of the time tracking tool, the operation comprising providing an interface including an indication that during the first time period the computer was in an inactive state while the time tracking tool was tracking time, a control associated with the first time period that removes the first time period from the tracked time, an indication that during the second time period the computer was in an active state while the time tracking tool was not tracking time, and a control associated with the second time period that adds the second time period to the tracked time.

12. The medium of claim 11, the operations further comprising, in response to a determination that the activity of the computer relative to the status of the time tracking tool does not warrant performance of an operation related to the time tracking tool, continuing to monitor activity of the computer associated with the time tracking tool relative to the status of the time tracking tool.

13. The medium of claim 11:

wherein monitoring status of the time tracking tool configured to track time spent in completing one or more tasks comprises monitoring whether or not a timer included in the time tracking tool has been tracking time;

wherein monitoring activity of the computer associated with the time tracking tool relative to the status of the time tracking tool comprises tracking an amount of time the computer has been idle while the timer included in the time tracking tool has been tracking time; and wherein evaluating the activity of the computer relative to the status of the time tracking tool with respect to one or more rules comprises comparing the tracked amount of time the computer has been idle while the timer included in the time tracking tool has been tracking time to a threshold amount of time.

* * * * *